(12) United States Patent
Hunsaker et al.

(10) Patent No.: US 11,418,854 B2
(45) Date of Patent: Aug. 16, 2022

(54) MILESTONE DETERMINATION ASSOCIATED WITH VIDEO PRESENTATION

(71) Applicant: Verizon Media Inc., New York, NY (US)

(72) Inventors: Trevor Deren Hunsaker, Bountiful, UT (US); Ofer Shem Tov, Tel Aviv (IL)

(73) Assignee: YAHOO AD TECH LLC, Dulles, VA (US)

( * ) Notice: Subject to any disclaimer, the term of this patent is extended or adjusted under 35 U.S.C. 154(b) by 0 days.

(21) Appl. No.: 17/126,702

(22) Filed: Dec. 18, 2020

(65) Prior Publication Data

US 2022/0201367 A1 Jun. 23, 2022

(51) Int. Cl.
| | |
|---|---|
| G06F 15/16 | (2006.01) |
| H04N 21/81 | (2011.01) |
| H04N 21/845 | (2011.01) |
| H04L 67/01 | (2022.01) |
| H04L 67/02 | (2022.01) |
| H04N 21/462 | (2011.01) |

(52) U.S. Cl.
CPC ........... *H04N 21/812* (2013.01); *H04L 67/02* (2013.01); *H04L 67/42* (2013.01); *H04N 21/4622* (2013.01); *H04N 21/8456* (2013.01)

(58) Field of Classification Search
CPC ............. H04N 21/812; H04N 21/4622; H04N 21/8456; H04L 67/02; H04L 67/42

USPC ................................ 709/203, 217, 223, 231
See application file for complete search history.

(56) References Cited

U.S. PATENT DOCUMENTS

| | | | |
|---|---|---|---|
| 2014/0040026 A1* | 2/2014 | Swaminathan | G06Q 30/02 705/14.53 |
| 2016/0014479 A1* | 1/2016 | Gower | H04N 21/8549 725/93 |
| 2019/0259424 A1* | 8/2019 | Lintz | H04N 21/4394 |
| 2019/0364317 A1* | 11/2019 | Milford | H04N 21/2187 |
| 2019/0364319 A1* | 11/2019 | Milford | H04N 21/812 |

* cited by examiner

*Primary Examiner* — Liang Che A Wang
(74) *Attorney, Agent, or Firm* — Cooper Legal Group LLC

(57) ABSTRACT

One or more computing devices, systems, and/or methods are provided. A manifest associated with a first video may be generated. The manifest may include a first web address associated with accessing the first video, one or more first milestone markers of the first video, and/or one or more first beacon web addresses associated with the one or more first milestone markers. The manifest may be transmitted to a first client device. An indication addressed to a first beacon web address of the one or more first beacon web addresses may be received from the first client device. It may be determined, based upon the indication addressed to the first beacon web address, that the first client device displayed a first portion of the first video corresponding to a first milestone marker, of the one or more first milestone markers, associated with the first beacon web address.

20 Claims, 11 Drawing Sheets

MILESTONE DETERMINATION ASSOCIATED WITH VIDEO PRESENTATION

BACKGROUND

Many services, such as websites, applications, etc. may provide platforms for viewing and/or downloading videos from a server.

SUMMARY

In accordance with the present disclosure, one or more computing devices and/or methods are provided. In an example, a first request for presentation of a first video via a first client device may be received. One or more first content items may be selected for presentation via the first client device. A first plurality of videos may be generated using the first video and the one or more first content items. A second video of the first plurality of videos comprises at least a portion of a first content item of the one or more first content items. A third video of the first plurality of videos comprises a video segment of the first video. The first plurality of videos may be stored on one or more first servers. A manifest may be generated. The manifest may comprise a first web address associated with accessing the second video of the first plurality of videos, one or more first milestone markers of the second video, and/or one or more first beacon web addresses associated with the one or more first milestone markers. The manifest may be transmitted to the first client device.

In an example, a first request for presentation of a first video via a first client device may be received. A first plurality of videos may be generated using the first video. A second video of the first plurality of videos comprises a video segment of the first video. The first plurality of videos may be stored on one or more first servers. A manifest may be generated. The manifest may comprise a first web address associated with accessing the second video of the first plurality of videos, one or more first milestone markers of the second video, and/or one or more first beacon web addresses associated with the one or more first milestone markers. The manifest may be transmitted to the first client device.

In an example, a manifest associated with a first video may be generated. The manifest may comprise a first web address associated with accessing the first video, one or more first milestone markers of the first video, and/or one or more first beacon web addresses associated with the one or more first milestone markers. The manifest may be transmitted to a first client device. An indication addressed to a first beacon web address of the one or more first beacon web addresses may be received from the first client device. It may be determined, based upon the indication addressed to the first beacon web address, that the first client device displayed a first portion of the first video corresponding to a first milestone marker, of the one or more first milestone markers, associated with the first beacon web address.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
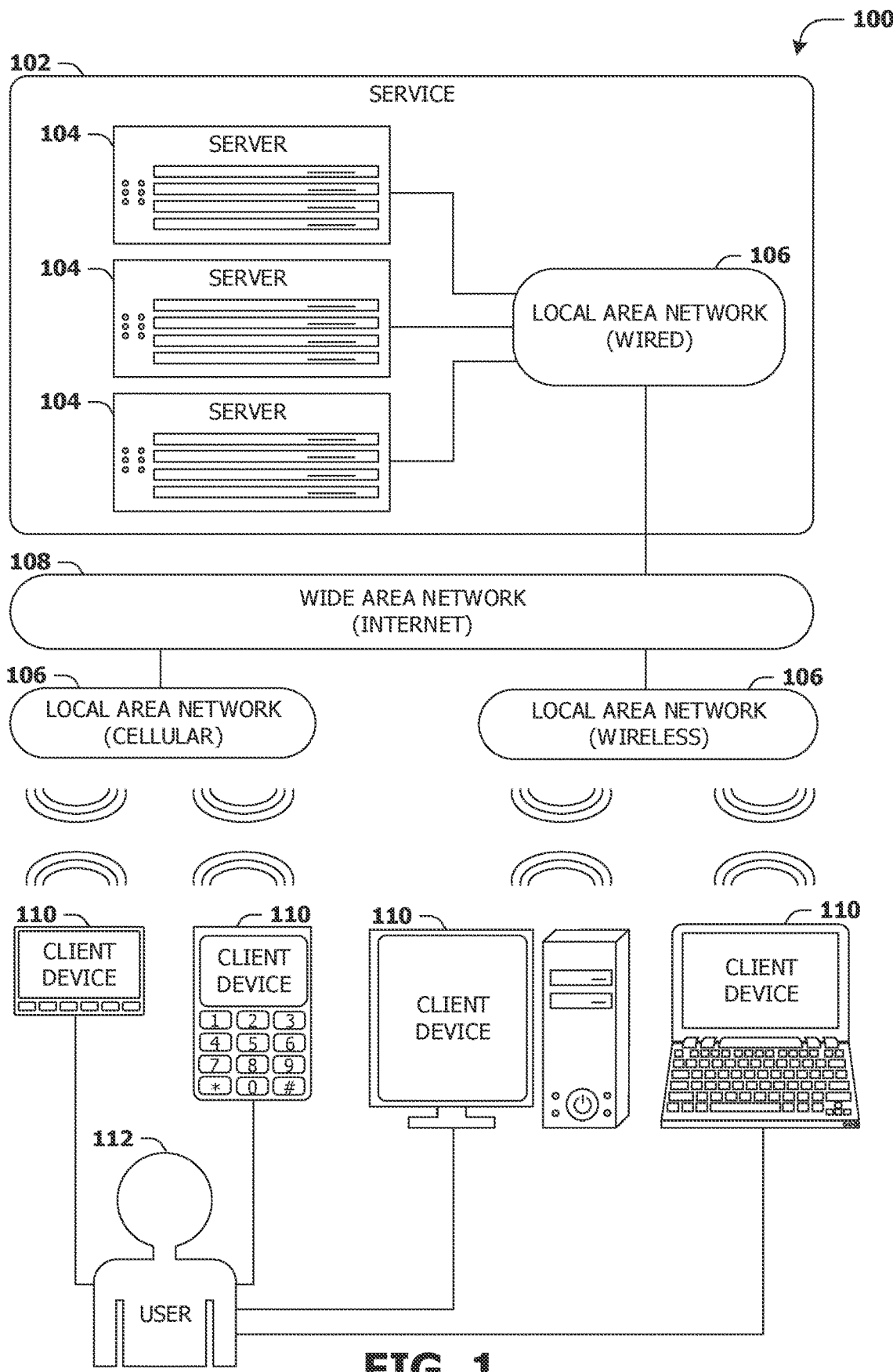
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
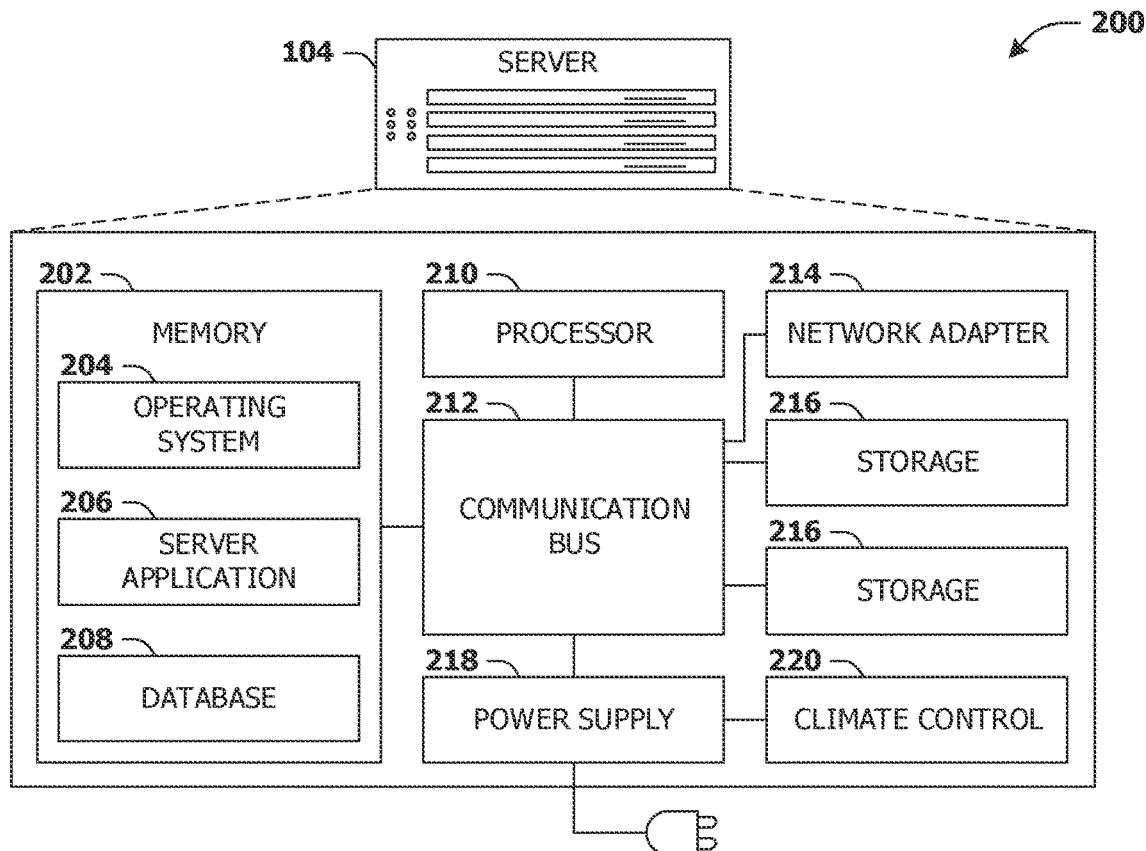
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
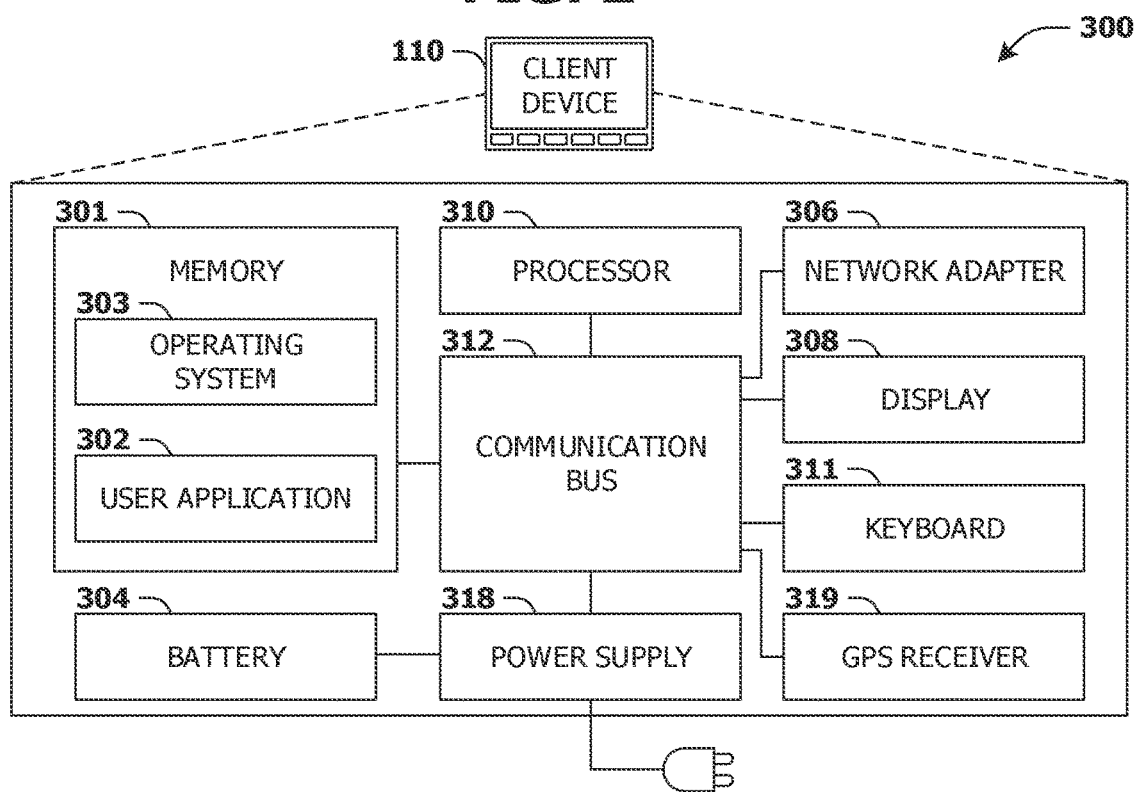
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining milestone information associated with video presentation are provided. For example, a user (and/or a device associated with the user) may access and/or interact with a service, such as at least one of a browser, software, a website, an application, an operating system, etc. that provides a platform for viewing and/or downloading videos from a server (e.g., a server associated with the service). Metrics associated with presentation of a video provided by the service may be beneficial to one or more entities associated with the video. The metrics may comprise at least one of a measure of devices that start the video (e.g., a quantity of devices on which presentation of the video starts), a measure of devices that display a certain portion of the video (e.g., a quantity of devices on which the certain portion of the video is presented and/or a rate at which devices that start the video also present the certain portion of the video), a measure of devices that display the video completely (e.g., a quantity of devices that completely present the video and/or a rate at which devices that start the video completely present the video), etc. In some examples, the one or more entities may comprise an entity (e.g., a website, an application, a service, a periodical publication, a company, a person and/or an organization) that publishes, distributes, creates, originates, funds, distributes, manages, and/or oversees production of the video. The metrics may be used for determining viewership information associated with the video, determining an amount of compensation for presentation of the video, etc. However, milestone information associated with presentation of the video via devices, such as portions of the video that are displayed via a device, is required for determining the metrics.

Thus, in accordance with one or more of the techniques presented herein, a manifest associated with a first video may be generated. The manifest may be used by a device for presenting the first video. The manifest may comprise a first web address (e.g., a Uniform Resource Locator (URL)) associated with accessing the first video, one or more first milestone markers of the first video, and/or one or more first beacon web addresses associated with the one or more first milestone markers. A milestone marker of the one or more first milestone markers may be indicative of at least one of a time of the first video, a portion of the first video, a video frame of the first video, etc. The manifest may be transmitted to a first client device. The first client device may use the manifest to present the first video. For example, the first client device may access and/or download the first video from a server using the first web address. An indication addressed to a first beacon web address of the one or more first beacon web addresses may be received from the first client device. The first beacon web address may be associated with a first milestone marker of the one or more milestone markers. The first milestone marker may correspond to a first portion of the first video. It may be determined, based upon the indication addressed to the first beacon web address, that the first client device displayed the first portion of the first video. For example, the first client device may transmit the indication addressed to the first beacon web address responsive to reaching a milestone associated with the first milestone marker, such as responsive to the first client device displaying the first portion of the first video corresponding to the first milestone marker.

Figure 4:
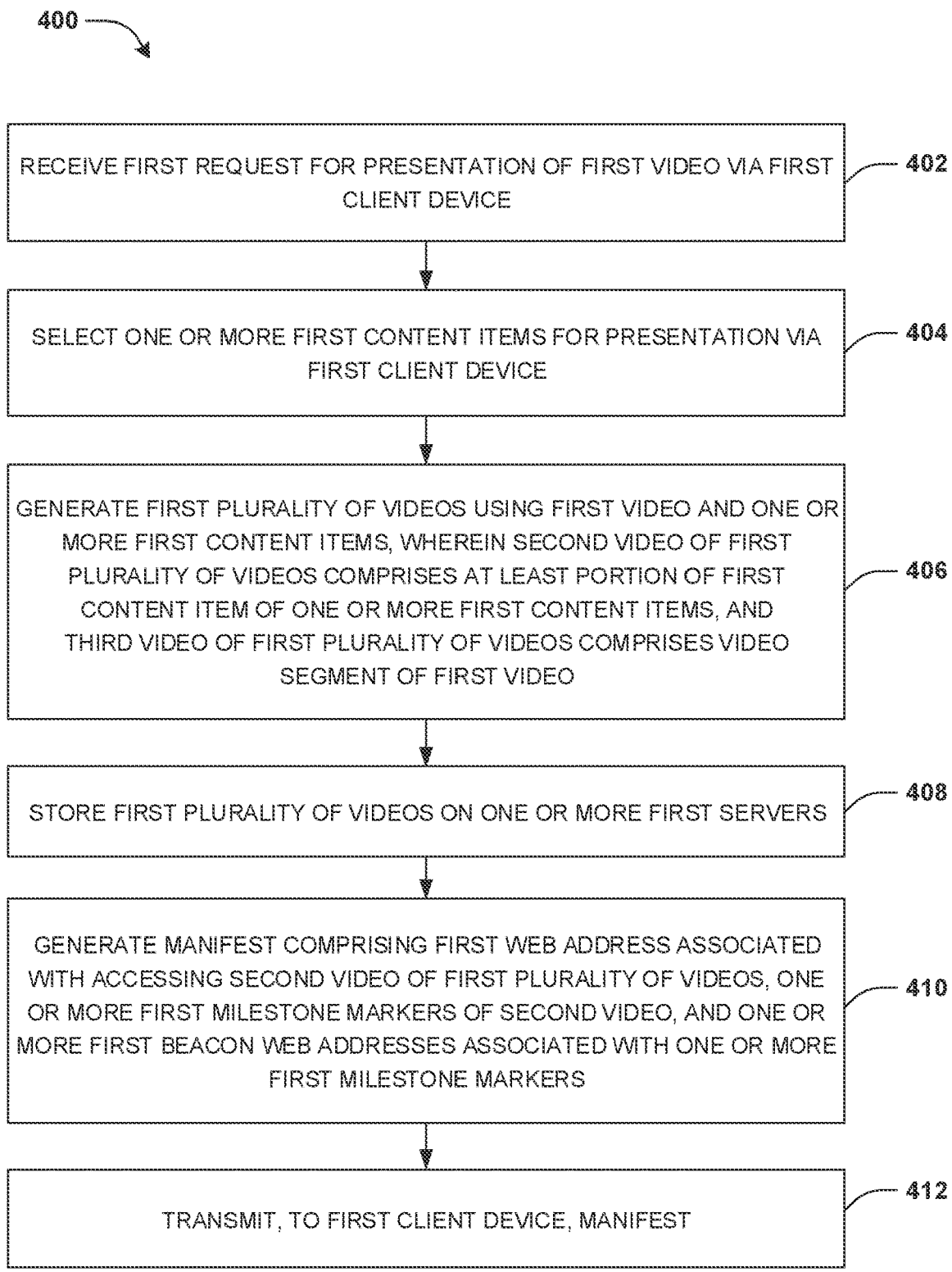
FIG. 4 is a flow chart illustrating an example method for determining milestone information associated with video presentation.

An embodiment of determining milestone information associated with video presentation is illustrated by an example method 400 of FIG. 4. A content system for presenting content via client devices may be provided. For example, client devices may access and/or interact with one or more services, such as one or more web pages, one or more applications, one or more content interfaces, etc. for viewing and/or downloading content from one or more servers associated with the content system. For example, the content may provide access to videos (e.g., at least one of livestream videos, movies, TV shows, sports videos, news-related videos, news channel video clips, internet news video clips, educational videos, how-to videos, educational video clips, documentaries, entertainment videos, sports-related video clips, informational videos, interview-related videos, video clips of meetings, advertisements, etc.) and/or one or more other types of content.

A first user, such as user Jill, and/or a first client device associated with the first user, may access and/or interact with a service, such as a website, an application, etc. that provides a platform for viewing and/or downloading videos from a server associated with the content system. For example, a graphical user interface of the first client device may be controlled to display a video interface comprising a list of videos associated with videos that may be accessed, viewed and/or downloaded via the video interface. In some examples, the first client device may comprise at least one of a computer, a smartphone, a wearable computer, a TV, a laptop, etc.

At 402, a first request for presentation of a first video via the first client device may be received. In some examples, the first request may be received responsive to one or more selections of one or more selectable inputs of the video interface. For example, the first request may be received responsive to a selection of a selectable item, of the list of videos, corresponding to the first video. For example, the first video may comprise at least one of a livestream video, a movie, a TV show, a sports video, a news-related video, a news channel video clip, an internet news video clip, an educational video, a how-to video, an educational video clip, a documentary, an entertainment video, a sports-related video clip, an informational video, an interview-related video, a video clip of a meeting, an advertisement, etc.

In some examples, the first request may correspond to a request for presentation of the first video and/or to provide one or more content items, such as one or more advertisements, for presentation via the first client device. In an example, the content system may be an advertisement system (e.g., an online advertising system). Alternatively and/or additionally, the content system may provide content items to be presented along with videos presented via the video interface. For example, a content item (e.g., an advertisement) may be presented before, during and/or after a video is presented via the video interface. Alternatively and/or additionally, a user may be required to watch and/or interact with the content item before the user can watch one or more portions of a video. Alternatively and/or additionally, the content system may provide content items to be presented via pages associated with the content system. For example, the pages may be associated with websites (e.g., websites providing search engines, email services, news content, communication services, etc.) associated with the content system.

In some examples, the content system may provide content items for presentation via client devices based upon (past) user activity associated with the client devices. For example, the content system may generate and/or maintain a user profile database comprising a plurality of user profiles associated with a plurality of client devices and/or a plurality of user accounts (e.g., content platform accounts for uploading content, consuming videos, articles and/or music, email accounts, messaging accounts, etc.) associated with the content system. A first user profile of the plurality of user profiles may be associated with the first client device and/or a first user account associated with the first client device. The first user profile may comprise demographic information, such as an age (and/or age range), family size, gender, occupation, income, and/or other demographic information. Alternatively and/or additionally, the first user profile may comprise activity information associated with the first client device and/or the first user account. For example, the activity information may be indicative of at least one of one or more consumed content items (e.g., one or more content items, such as an article, a video, an audio file, an image, a webpage, an advertisement, an email, a message, etc., consumed by the first user), one or more accessed content items (e.g., one or more content items accessed by the first client device), one or more selected content items (e.g., one or more content items selected via the first client device), one or more content item interactions (e.g., an advertisement impression, an advertisement click, a conversion associated with an advertisement, etc.), etc.

At 404, one or more first content items may be selected for presentation via the first client device. In some examples, the one or more first content items may be one or more advertisements selected for presentation via the first client device in association with presentation of the first video via the first client device. The one or more first content items may be selected for presentation via the first client device before, during and/or after presentation of the first video. In some examples, the one or more first content items may comprise at least one of one or more videos, one or more audio files, one or more images, etc.

In some examples, a bidding process may be performed to select one or more content items from a first plurality of content items participating in an auction (e.g., an auction for selection of a content item to present via the first client device). In some examples, the first plurality of content items (participating in the auction) may comprise the one or more first content items.

In some examples, a first plurality of bid values associated with the first plurality of content items may be determined. In some examples, the first plurality of bid values may be determined based upon budgets (e.g., daily budgets) and/or target spend patterns associated with the first plurality of content items. For example, the first plurality of bid values and/or the budgets may be received from devices associated with entities (e.g., advertisers, companies, brands, organizations, etc.) associated with the first plurality of content items. In some examples, the first plurality of bid values may comprise one or more first bid values associated with the one or more first content items.

In some examples, the one or more first content items may be selected from the first plurality of content items for presentation via the first client device based upon the first plurality of bid values. For example, the one or more first content items may be selected from the first plurality of content items based upon a determination that the one or more first bid values associated with the one or more first content items exceed a threshold bid value. Alternatively and/or additionally, the one or more first content items may be selected from the first plurality of content items based upon a determination that the one or more first bid values are highest bid values of the first plurality of bid values.

Alternatively and/or additionally, a first plurality of content item scores may be determined. For example, the first plurality of content items scores may be determined based upon the first plurality of bid values and/or a first plurality of click probabilities. The first plurality of click probabilities may be determined based upon content information associated with the first plurality of content items and/or the first user profile associated with the first client device. In some examples, a click probability of the first plurality of click probabilities may correspond to a probability of receiving a selection of a content item responsive to presenting the content item via the first client device. Alternatively and/or additionally, a click probability of the first click probabilities may correspond to a probability of receiving a positive signal responsive to presenting a content item via the first client device. For example, the positive signal may be indicative of the content item being consumed by the first user. Alternatively and/or additionally, the positive signal may be indicative of one or more user interactions with the content item. Alternatively and/or additionally, the positive signal may be indicative of the content item being presented (and/or the content item being presented for longer than a threshold duration of time) via the first client device.

In some examples, the one or more first content items may be selected from the first plurality of content items for presentation via the first client device based upon the first plurality of content item scores. For example, the one or more first content items may be selected from the first plurality of content items based upon a determination that one or more first content item scores associated with the one or more first content items exceed a threshold content item score. Alternatively and/or additionally, the one or more first content items may be selected from the first plurality of content items based upon a determination that the one or more first content item scores are highest content item scores of the first plurality of content item scores.

At 406, a first plurality of videos may be generated using the first video and/or the one or more first content items. In some examples, a video of the first plurality of videos (and/or each video of the first plurality of videos) comprises at least a portion of a content item of the one or more first content items and/or a video segment of the first video (e.g., the video segment may be a portion and/or a section of the first video).

In some examples, a second video of the first plurality of videos comprises at least a portion of a first content item of the one or more first content items. The second video may comprise a video segment of the first video. In some examples, a third video of the first plurality of videos comprises a first video segment of the first video. The third video may comprise at least a portion of a content item of the one or more first content items. In an example, the first plurality of videos corresponds to a video stream comprising the first video and the one or more first content items. For example, videos of the first plurality of videos may correspond to segments of the video stream. In some examples, the video stream is segmented (e.g., into the first plurality of videos) due to streaming specifications associated with presenting the video stream via the first client device. Alternatively and/or additionally, the video stream may not be segmented (e.g., a single video corresponding to the video stream (comprising the first video and the one or more first content items) may be generated (rather than the first plurality of videos)).

In some examples, the first plurality of videos may be generated based upon a video configuration. The video configuration may be indicative of at least one of an arrangement of the first plurality of videos, a time duration of videos of the first plurality of videos, etc. In some examples, the arrangement of the video configuration may correspond to an order with which the first plurality of videos is presented (e.g., the order of videos may be indicative of a video of the first plurality of videos that is initially presented, a video of the first plurality of videos that is presented directly following the first plurality of videos, etc.). Alternatively and/or additionally, the arrangement may correspond to times that the one or more first content items are presented with respect to times of sections of the first video.

In an example, the arrangement may be indicative of one or more second content items, of the one or more first content items, being presented prior to presentation the first video. Thus, one or more initial videos of the first plurality of videos may be generated to comprise video corresponding to the one or more second content items followed by video corresponding to a section of the first video.

In an example, the order configuration may be indicative of one or more third content items, of the one or more first content items, being presented between a first section of the first video and a second section of the first video. Thus, one or more videos of the first plurality of videos may be generated to comprise video corresponding to at least a portion of the first section of the first video, followed by video corresponding to the one or more third content items, followed by video corresponding to at least a portion of the second section of the first video.

In some examples, the time duration of the video configuration may correspond a duration of time of a video of the first plurality of videos, such as 15 seconds, 30 seconds, 60 seconds, etc. In an example, the time duration of the video configuration may correspond to a maximum duration of 30 seconds. Accordingly, each video of the first plurality of videos may be generated having a time duration of 30 seconds or less of video.

In some examples, the first plurality of videos may be generated by encoding the first video and/or the one or more first content items based upon one or more bit rates and/or one or more resolutions. The one or more bit rates and/or the one or more resolutions may be received via the first request. Alternatively and/or additionally, the one or more bit rates and/or the one or more resolutions may be selected (e.g., automatically selected) by the content system. A video of the first plurality of videos may have a bit rate of the one or more bit rates and/or a resolution of the one or more resolutions. In some examples, the one or more bit rates comprise different bit rates (such as where videos of the plurality of videos have varying bit rates). In an example, the one or more bit rates may comprise a first bit rate for the first video and/or a second bit rate for a content item of the one or more first content items. For example, the first video may be encoded at the first bit rate to generate at least some video of the first plurality of videos corresponding to the first video and/or the content item may be encoded at the second bit rate to generate at least some video of the first plurality of videos corresponding to the content item. In some examples, the one or more bit rates comprise a single bit rate (such as where videos of the plurality of videos have a single (e.g., constant) bit rate). For example, the first video and/or the one or more first content items may be encoded at the single bit rate to generate the first plurality of videos. In some examples, the one or more resolutions comprise different resolutions (such as where videos of the plurality of videos have varying resolutions). In an example, the one or more resolutions may comprise a first resolution for the first video and/or a second resolution for a content item of the one or more first content items. For example, the first video may be encoded at the first resolution to generate at least some video of the first plurality of videos corresponding to the first video and/or the content item may be encoded at the second resolution to generate at least some video of the first plurality of videos corresponding to the content item. In some examples, the one or more resolutions comprise a single resolution (such as where videos of the plurality of videos have a single (e.g., constant) resolution). For example, the first video and/or the one or more first content items may be encoded at the single resolution to generate the first plurality of videos.

FIGS. 5A-5G illustrate examples of a system 501 for determining milestone information associated with video presentation, described with respect to the example method 400 of FIG. 4.

Figure 5A:
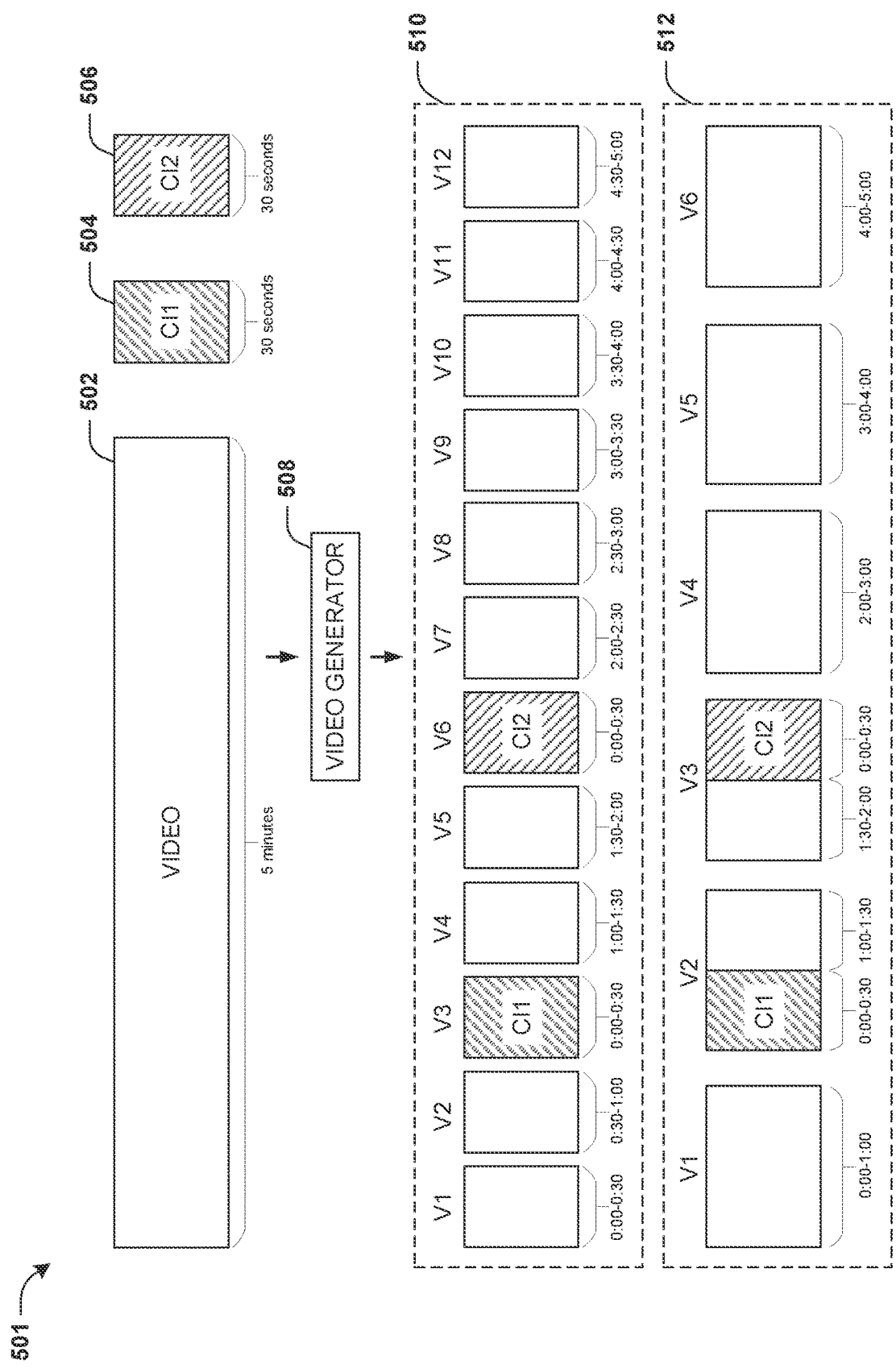
FIG. 5A is a diagram illustrating an exemplary system for determining milestone information associated with video presentation, where a first plurality of videos is generated based upon a first video and/or one or more first content items.

FIG. 5A illustrates generation of the first plurality of videos (examples of which are shown with reference numbers 510 and 512) based upon the first video (shown with reference number 502) and/or the one or more first content items. For example, the one or more first content items may comprise the first content item "CI1" (shown with reference number 504) and/or a second content item "CI2" 506. The first content item 504 and/or the second content item 506 may be advertisements and/or other types of content. The first content item 504 and/or the second content item 506 may be videos each having time durations of 30 seconds (and/or other time durations). The first video 502 may have a time duration of 5 minutes (and/or a different time duration).

The first plurality of videos may be generated by a video generator 508 using the first video 502, the first content item 504 and/or the second content item 506. For example, the video generator 508 may generate the first plurality of videos based upon the video configuration, such as at least one of the arrangement of the first plurality of videos, the time duration of videos of the first plurality of videos, etc.

In a first example 510 of the first plurality of videos, each video of the first plurality of videos may have a time duration of 30 seconds (or less) of video. For example, the video generator 508 may generate the first plurality of videos having the time duration of 30 seconds (or less) based upon an indication in the video configuration of a maximum duration of 30 seconds. In the first example 510 of the first plurality of videos, a video V1 of the first plurality of videos comprises a video segment 0:00-0:30 of the first video 502 (e.g., the video segment 0:00-0:30 corresponds to the initial 30 seconds of the first video 502), a video V2 of the first plurality of videos comprises a video segment 0:30-1:00 of the first video 502 (e.g., the video segment 0:30-1:00 of the first video 502 directly follows the video segment 0:00-0:30 of the first video 502), a video V3 of the first plurality of videos comprises the first content item 504, a video V4 of the first plurality of videos comprises a video segment 1:00-1:30 of the first video 502 (e.g., the video segment 1:00-1:30 of the first video 502 directly follows the video segment 0:30-1:00 of the first video 502), a video V5 of the first plurality of videos comprises a video segment 1:30-2:00 of the first video 502 (e.g., the video segment 1:30-2:00 of the first video 502 directly follows the video segment 1:00-1:30 of the first video 502), a video v6 of the first plurality of videos may comprise the second content item 506, a video V7 of the first plurality of videos comprises a video segment 2:00-2:30 of the first video 502 (e.g., the video segment 2:00-2:30 of the first video 502 directly follows the video segment 1:30-2:00 of the first video 502), etc. The arrangement of the video configuration may be indicative of the first content item 504 being presented between the video segment 0:30-1:00 of the first video 502 and the video segment 1:00-1:30 of the first video 502. Accordingly, the video V3 comprising the first content item 504 may be arranged between the video V2 comprising the video segment 0:30-1:00 of the first video 502 and the video V4 comprising the video segment 1:00-1:30 of the first video 502 such that the first content item 504 is presented between the video segment 0:30-1:00 of the first video 502 and the video segment 1:00-1:30 of the first video 502. Alternatively and/or additionally, the arrangement of the video configuration may be indicative of the second content item 506 being presented between the video segment 1:30-2:00 of the first video 502 and the video segment 2:00-2:30 of the first video 502. Accordingly, the video V6 comprising the second content item 506 may be arranged between the video V5 comprising the video segment 1:30-2:00 of the first video 502 and the video V7 comprising the video segment 2:00-2:30 of the first video 502 such that the second content item 506 is presented between the video segment 1:30-2:00 of the first video 502 and the video segment 2:00-2:30 of the first video 502.

In a second example 512 of the first plurality of videos, each video of the first plurality of videos may have a time duration of 60 seconds (or less) of video. For example, the video generator 508 may generate the first plurality of videos having the time duration of 60 seconds (or less) based upon an indication in the video configuration of a maximum duration of 60 seconds. In the second example 512 of the first plurality of videos, a video V1 of the first plurality of videos comprises a video segment 0:00-1:00 of the first video 502 (e.g., the video segment 0:00-1:00 corresponds to the initial 60 seconds of the first video 502), a video V2 of the first plurality of videos comprises the first content item 504 followed by a video segment 1:00-1:30 of the first video 502, a video V3 of the first plurality of videos comprises a video segment 1:30-2:00 of the first video 502 followed by the second content item 506, a video V4 of the first plurality of videos comprises a video segment 2:00-3:00 of the first video 502, etc. The arrangement of the video configuration may be indicative of the first content item 504 being presented between the video segment 0:00-1:00 of the first video 502 and the video segment 1:00-1:30 of the first video 502. Alternatively and/or additionally, the arrangement of the video configuration may be indicative of the second content item 506 being presented between the video segment 1:30-2:00 of the first video 502 and the video segment 2:00-3:00 of the first video 502.

At 408, the first plurality of videos may be stored on one or more first servers. The one or more first servers may be associated with the content system (and/or a different system). The one or more first servers may be configured to provide one or more videos of the first plurality of videos to be presented via one or more client devices, such as the first client device.

At 410, a first manifest may be generated. The first manifest may be used for presentation of the first plurality of videos via one or more client devices such as the first client device. In some examples, the first manifest may comprise one or more access web addresses associated with accessing one or more videos of the first plurality of videos. In an example, an access web address of the one or more access web addresses may comprise a URL associated with accessing one or more videos of the first plurality of videos. In an example, each web address of the one or more access web addresses may be used, by a client device, to download one or more videos of the first plurality of videos from a server of the one or more first servers. In an example, the first manifest may comprise a first access web address associated with accessing the second video (comprising at least a portion of the first content item). The second video may be accessed, retrieved and/or downloaded from the one or more first servers, by the first client device.

In some examples, the first manifest may comprise one or more first milestone markers of the second video, one or more first beacon web addresses associated with the one or more first milestone markers and/or other information. In some examples, the one or more first milestone markers may correspond to one or more times of the second video, one or more video frames of the second video, and/or one or more portions of the second video. For example, a first milestone marker of the one or more first milestone markers may correspond to a first time of the second video, a first video frame of the second video and/or a first portion of the second video. In some examples, the first milestone marker may be associated with a first beacon web address of the one or more first beacon web addresses. In an example, a beacon web address of the one or more first beacon web addresses may comprise a URL. In some examples, the one or more first milestone markers and/or the one or more first beacon web addresses may comprise (and/or may be a part of) timed metadata of the first manifest.

In some examples, a client device presenting the second video is configured such that the client device transmits, based upon the first manifest, a milestone indication addressed to a beacon web address of the one or more first beacon web addresses responsive to reaching a milestone associated with a milestone marker associated with the beacon web address. For example, the first client device is configured such that while the first client device plays the second video (such as in association with accessing and/or downloading the second video from the one or more first servers), the first client device transmits, based upon the first manifest, a first milestone indication addressed to the first beacon web address responsive to reaching a first milestone associated with the first milestone marker.

In an example, the first milestone marker may correspond to the first time of the second video and/or the first milestone may correspond to presentation of the second video reaching the first time of the second video (e.g., the first time of the second video may correspond to a playback position within the second video). In an example where the first time corresponds to a time 0:10 of the second video, presentation of the second video may reach the first time of the second video when presentation of a video segment 0:00-0:10 of the second video is complete. For example, the first client device may transmit the first milestone indication addressed to the first beacon web address responsive to presentation of the second video reaching the first time of the second video. Alternatively and/or additionally, the first client device may transmit the first milestone indication addressed to the first beacon web address responsive to a determination that the presentation of the second video will reach the first time of the second video within a duration of time. In an example where the first time of the second video is a time 0:10 of the second video and the duration of time is five seconds, the first client device may transmit the first milestone indication addressed to the first beacon web address responsive to a determination that presentation of a video segment 0:00-0:05 of the second video is complete and/or that presentation of the second video will reach the first time of the second video within five seconds.

In an example, the first milestone marker may correspond to the first video frame of the second video and/or the first milestone may correspond to the first video frame of the second video being presented. For example, the first client device may transmit the first milestone indication addressed to the first beacon web address responsive to the first video frame of the second video being presented (and/or based upon a determination that the first video frame of the second video is, was and/or will be presented). Alternatively and/or additionally, the first client device may transmit the first milestone indication addressed to the first beacon web address responsive to a determination that presentation of the first video frame of the second video will be performed within a duration of time. In an example where the first video frame of the second video is at a time 0:10 of the second video and the duration of time is five seconds, the first client device may transmit the first milestone indication addressed to the first beacon web address responsive to a determination that a video frame at a time 0:05 of the second video has been presented and/or the first video frame of the second video will be presented within five seconds.

In an example, the first milestone marker may correspond to the first portion of the second video and/or the first milestone may correspond to the first portion of the second video being presented. For example, the first client device may transmit the first milestone indication addressed to the first beacon web address responsive to the first portion of the second video being presented (and/or based upon a determination that the first portion of the second video is, was and/or will be presented). Alternatively and/or additionally, the first client device may transmit the first milestone indication addressed to the first beacon web address responsive to a determination that presentation of the first portion of the second video will be complete within a duration of time. In an example where the first portion of the second video comprises a video segment 0:10-0:20 of the second video and the duration of time is five seconds, the first client device may transmit the first milestone indication addressed to the first beacon web address responsive to a determination that a portion 0:10-0:15 of the video segment 0:10-0:20 has been presented and/or that presentation of the video segment 0:10-0:20 of the second video will be complete within five seconds.

In some examples, milestones associated with presentation of portions of the first plurality of videos that do not correspond to the one or more first content items (e.g., portions of the first plurality of videos that do correspond to the first video) may not be tracked via milestone indications. For example, merely milestones associated with presentation of portions of the first plurality of videos that correspond to the one or more first content items may be tracked via milestone indications. In an example, the one or more first milestone markers may correspond to one or more times, one or more video frames, and/or one or more portions of the second video that correspond to the first content item (and/or one or more other content items of the one or more first content items). For example, milestone markers may not be included in the first manifest for times, video frames, and/or portions of the second video (and/or portions of other videos of the first plurality of videos) that do not correspond to a content item of the one or more first content items. In an example, the first client device may not transmit milestone indications associated with times, video frames, and/or portions of the first plurality of videos that do not correspond to a content item of the one or more first content items.

Alternatively and/or additionally, milestones associated with presentation of portions of the first plurality of videos that do not correspond to the one or more first content items (e.g., portions of the first plurality of videos that do correspond to the first video) may be tracked via milestone indications. In an example, the one or more first milestone markers may correspond to one or more times, one or more video frames, and/or one or more portions of the second video that correspond to a video segment of the first video and/or the first content item. For example, milestone markers may be included in the first manifest for times, video frames, and/or portions of the second video (and/or portions of other videos of the first plurality of videos) that correspond to the first video and/or the one or more first content items.

In some examples, the one or more first beacon web addresses of the first manifest may comprise multiple beacon web addresses for a milestone marker of the one or more first milestone markers (and/or the one or more first beacon web addresses may comprise multiple beacon web addresses for each milestone marker of the one or more milestone markers). For example, a milestone marker of the one or more first milestone markers (and/or each milestone marker of the one or more first milestone markers) is associated with multiple beacon web addresses of the one or more first beacon web addresses, where the multiple beacon web addresses may be associated with various entities.

In an example, the first milestone marker of the one or more first milestone markers may be associated with a plurality of beacon web addresses of the one or more first beacon web addresses. For example, the plurality of beacon web addresses may comprise the first beacon web address and/or a second beacon web address (and/or one or more other beacon web addresses). The first beacon web address may be associated with a first entity and/or the second beacon web address may be associated with a second entity (and/or the one or more other beacon web addresses may be associated with one or more other entities). For example, the first beacon web address may correspond to a first server associated with the first entity (e.g., the first beacon web address may be assigned to an IP address associated with the first server) and/or the second beacon web address may correspond to a second server associated with the second entity (e.g., the second beacon web address may be assigned to an IP address associated with the second server). In some examples, the first manifest is configured such that while the first client device plays the second video (such as in association with accessing and/or downloading the second video from the one or more first servers), the first client device transmits a plurality of milestone indications responsive to reaching the first milestone associated with the first milestone marker, wherein each milestone indication of the plurality of milestone indications is addressed to a beacon web address of the plurality of beacon web addresses associated with the first milestone marker. For example, the first client device may transmit the first milestone indication addressed to the first beacon web address, a second milestone indication addressed to the second beacon web address and/or one or more other milestone indications addressed to one or more other beacon web addresses of the plurality of beacon web addresses associated with the first milestone marker. In some examples, the plurality of milestone indications may be the same (e.g., the first milestone indication may be the same as the second milestone indication). Alternatively and/or additionally, the plurality of milestone indications may be different (e.g., the first milestone indication may be the different than the second milestone indication).

In some examples, the first entity may be different than the second entity. In an example, the first entity may be associated with the content system that provides for presentation of the first video and/or the one or more first content items. In some examples, the first server is a server of the content system. For example, transmission of the first milestone indication addressed to the first beacon web address by the first client device may be received (by the content system) via the first server.

In an example where the first milestone marker is associated with the first content item (e.g., such as where the first milestone marker corresponds to a time, a video frame and/or a portion of the second video corresponding to the first content item), the second entity may be associated with the first content item. For example, the second entity may be an advertiser, a company, a brand, an organization, etc. The first content item may be associated with one or more products, one or more services, etc. associated with the second entity. For example, the second entity may upload, to the content system, the first content item. For example, the first content item may be uploaded to the content system via an advertising service. The first content item may be associated with a content campaign for promoting a brand, an image, a product and/or a service associated with the second entity. In some examples, the second server is a server associated with the second entity. For example, transmission of the second milestone indication addressed to the second beacon web address by the first client device may be received (by the second entity) via the second server. In some examples, the second server is a server of a first measurement service associated with tracking milestones associated with presentation of the first content item (and/or other content items associated with the content campaign) and/or determining metrics associated with presentation of the first content item (and/or other content items associated with the content campaign). For example, the first measurement service may use milestone indications received from client devices, such as the first client device, to track milestones associated with presentation of the first content item (and/or other content items associated with the content campaign) and/or determine metrics associated with presentation of the first content item (and/or other content items associated with the content campaign).

In an example where the first milestone marker is associated with the first video (e.g., such as where the first milestone marker corresponds to a time, a video frame and/or a portion of the second video corresponding to the first video), the second entity may be associated with the first video. For example, the second entity may be a website, an application, a service, a periodical publication, a company, a person and/or an organization that publishes, distributes, creates, originates, funds, distributes, manages, and/or oversees production of the first video. For example, transmission of the second milestone indication addressed to the second beacon web address by the first client device may be received (by the second entity) via the second server. In some examples, the second server is a server of a second measurement service associated with tracking milestones associated with presentation of the first video (and/or other videos associated with the second entity) and/or determining metrics associated with presentation of the first video (and/or other videos associated with the second entity). For example, the second measurement service may use milestone indications received from client devices, such as the first client device, to track milestones associated with presentation of the first video (and/or other videos associated with the second entity) and/or determine metrics associated with presentation of the first video (and/or other videos associated with the second entity).

At 412, the first manifest may be transmitted to the first client device. In some examples, a manifest configuration of the first manifest may be in accordance with at least one of a specification (e.g., HTTP Live Streaming (HLS) specification, Dynamic Adaptive Streaming over HTTP (DASH) specification, and/or one or more other specifications), a protocol, a format, etc. associated with a video player of the first client device (e.g., the video player may correspond to software used by the first client device and/or the video interface of the first client device to play and/or stream the second video and/or other videos of the first plurality of videos). The video player may correspond to a multi-media player configured to play and/or stream multiple types of content (e.g., at least one of video, audio, images, etc.). Alternatively and/or additionally, the video player may be configured to play and/or stream merely video.

In some examples, the manifest configuration may be configured such that the video player of the first client device is able to play and/or stream the second video and/or other videos of the first plurality of videos. For example, the manifest configuration of the first manifest (e.g., at least one of the specification, the protocol, the format, etc. of the manifest configuration) may be compatible with the video player such that the video player is able to use the first access web address and/or one or more other access web addresses in the first manifest to access and/or download the second video and/or one or more other videos of the first plurality of videos and/or such that the video player is able to use the one or more first milestone markers and/or the one or more first beacon web addresses to transmit a milestone indication addressed to one or more corresponding beacon web addresses responsive to reaching a milestone associated with a milestone marker. In some examples, the video player may employ one or more software development kits (SDK), such as Open Measurement SDK (OM SDK) and/or one or more other SDKs, in order to use the one or more first milestone markers and/or the one or more first beacon web addresses to transmit a milestone indication addressed to one or more corresponding beacon web addresses responsive to reaching a milestone associated with a milestone marker. The manifest configuration of the first manifest (e.g., at least one of the specification, the protocol, the format, etc. of the manifest configuration) may be in accordance with the one or more SDKs.

In some examples, responsive to receiving the first manifest, the first client device may use one or more access web addresses of the first manifest to download and/or retrieve one or more videos of the first plurality of videos. For example, the first client device may use the first access web address associated with the second video to download and/or retrieve the second video of the first plurality of videos. The first client device may download and/or retrieve the second video by transmitting a request for the second video addressed to the first access web address. The content system (and/or a server of the one or more first servers associated with the first access web address) may receive the request for the second video. Responsive to receiving the request for the second video, the second video may be transmitted to the first client device. In some examples, the first client device may stream the second video. For example, the first client device may present the second video (using the video player) while and/or after downloading the second video from the content system (e.g., the second video may be transmitted to the first client device in a stream of data, such as a continuous stream of data, that is played as the data arrives).

In some examples, the first milestone indication addressed to the first beacon web address may be received (such as by the first entity (e.g., the content system)). For example, the video player may transmit the first milestone indication addressed to the first beacon web address while playing the second video. Alternatively and/or additionally, the video player may transmit the first milestone indication addressed to the first beacon web address responsive to reaching the first milestone associated with the first milestone marker (and/or within a duration of time prior to the first milestone marker being reached). In some examples, it may be determined (such as by the first entity (e.g., the content system)) that the first milestone is reached based upon the first milestone indication addressed to the first beacon web address. For example, the first milestone (e.g., presentation of the second video reaching the first time of the second video, the first video frame of the second video being presented, and/or the first portion of the second video being presented) associated with the first milestone indication may be determined based upon the first beacon web address. For example, a beacon web address of the one or more first beacon web addresses may be indicative a milestone marker of the one or more first milestone markers (and/or a milestone associated with the milestone marker). In an example, the first beacon web address (and/or the second beacon web address) of the one or more first beacon web addresses may be indicative of the first milestone marker and/or the first milestone. Alternatively and/or additionally, another beacon web address of the one or more first beacon web addresses (different than the first beacon web address and/or the second beacon web address) of the one or more first beacon web addresses may be indicative of another milestone marker of the one or more first milestone markers (and/or a milestone associated with the another milestone marker).

For example, a third milestone indication addressed to a third beacon web address of the one or more first beacon web addresses may be received (such as by the first entity (e.g., the content system)). For example, the video player may transmit the third milestone indication addressed to the third beacon web address while playing the second video. Alternatively and/or additionally, the video player may transmit the third milestone indication addressed to the first beacon web address responsive to reaching a second milestone associated with a second milestone marker of the one or more first milestone markers (and/or within a duration of time prior to the second milestone marker being reached), such as using one or more techniques described herein with respect to the first milestone indication. In some examples, it may be determined (such as by the first entity (e.g., the content system)) that the second milestone is reached based upon the third milestone indication addressed to the third beacon web address. For example, the second milestone (e.g., presentation of the second video reaching a second time of the second video, a second video frame of the second video being presented, and/or a second portion of the second video being presented) associated with the third milestone indication may be determined based upon the third beacon web address. For example, the third beacon web address of the one or more first beacon web addresses may be indicative of the second milestone marker and/or the second milestone.

Alternatively and/or additionally, a fourth milestone indication addressed to a fourth beacon web address of the one or more first beacon web addresses may be received by the second entity. For example, the video player may transmit the fourth milestone indication addressed to the fourth beacon web address while playing the second video. Alternatively and/or additionally, the video player may transmit the fourth milestone indication addressed to the fourth web address responsive to reaching the second milestone associated with the second milestone marker of the one or more first milestone markers (and/or within a duration of time prior to the second milestone marker being reached). In some examples, it may be determined (such as by the second entity) that the second milestone is reached based upon the fourth milestone indication addressed to the fourth beacon web address. For example, the second milestone associated with the fourth milestone indication may be determined based upon the fourth beacon web address. For example, the fourth beacon web address of the one or more first beacon web addresses may be indicative of the second milestone marker and/or the second milestone.

Alternatively and/or additionally, rather than (and/or in addition to) determining one or more milestones associated with the one or more first milestone markers based upon one or more beacon web addresses to which one or more milestone indications are addressed, the one or more milestones may be determined based upon content of the one or more milestone indications. For example, the video player may be configured to include, in a milestone indication, information indicative of a milestone that is reached. For example, the first milestone indication and/or the second milestone indication associated with the first milestone may comprise an indication of the first milestone and/or the first milestone marker. Alternatively and/or additionally, the third milestone indication and/or the fourth milestone indication associated with the second milestone may comprise an indication of the second milestone and/or the second milestone marker. In some examples, instructions for generating a milestone indication (to include an indication of a milestone and/or a milestone marker) and/or transmitting the milestone indication may be transmitted to the first client device (such as via the first manifest and/or one or more other signals). For example, the video player may include information indicative of a milestone and/or a milestone marker in a milestone indication based upon the instructions. Alternatively and/or additionally, software of the video player may comprise programming to include information indicative of a milestone and/or a milestone marker in a milestone indication for transmission addressed to a beacon web address of the one or more first beacon web addresses.

Accordingly, the first milestone (e.g., presentation of the second video reaching the first time of the second video, the first video frame of the second video being presented, and/or the first portion of the second video being presented) may be determined (such as by the first entity (e.g., the content system)) based upon information, included in the first milestone indication, indicative of the first milestone and/or the first milestone marker. Alternatively and/or additionally, the first milestone may be determined by the second entity based upon information, included in the second milestone indication, indicative of the first milestone and/or the first milestone marker. Alternatively and/or additionally, the second milestone (e.g., presentation of the second video reaching the second time of the second video, the second video frame of the second video being presented, and/or the second portion of the second video being presented) may be determined (such as by the first entity (e.g., the content system)) based upon information, included in the third milestone indication, indicative of the second milestone and/or the second milestone marker. Alternatively and/or additionally, the second milestone may be determined by the second entity based upon information, included in the fourth milestone indication, indicative of the second milestone and/or the second milestone marker.

In some examples, manifests, such as comprising the first manifest, may be transmitted to the first client device by the content system. For example, a plurality of manifests comprising the first manifest may be transmitted (e.g., transmitted separately and/or together) to the first client device. A manifest of the plurality of manifests may comprise one or more access web addresses, one or more beacon web addresses and/or one or more milestone markers for merely some of the first plurality of videos (and/or all of the first plurality of videos). In some examples, each manifest of the plurality of manifests may comprise one or more access web addresses, one or more beacon web addresses and/or one or more milestone markers for one or more videos of the first plurality of videos.

In an example, the first manifest may comprise merely the first access web address associated with the second video, the one or more first beacon web addresses associated with the second video and/or the one or more first milestone markers associated with the second video. In the example, the first manifest may not comprise access web addresses, beacon web addresses and/or milestone markers associated with videos of the first plurality of videos other than the second video. Thus, in order to present videos of the first plurality of videos other than the second video, the first client device and/or the video player may require other manifests associated with the videos. Accordingly, a second manifest, of the plurality of manifests, may be transmitted to the first client device. The second manifest may be associated with one or more videos, of the first plurality of videos, other than the second video. For example, the second manifest may comprise one or more access web addresses, one or more beacon web addresses and/or one or more milestone markers associated with the one or more videos. The first client device and/or the video player may access the one or more videos and/or transmit milestone indications associated with the one or more videos using the second manifest. In some examples, the one or more videos may follow (e.g., directly follow) the second video. The second manifest may be transmitted to and/or received by the first client device prior to and/or upon completion of presentation of the second video via the first client device to enable the first client device to begin presenting the one or more videos following (and/or directly following) completion of the second video (such that there is no delay between presentation of the second video and presentation of the one or more videos and/or such that a delay between presentation of the second video and presentation of the one or more videos is less than a threshold delay).

In another example, the first manifest may be associated with multiple videos of the first plurality of videos. For example, the first manifest may comprise access web addresses associated with the multiple videos, one or more beacon web addresses associated with the multiple videos and/or one or more milestone markers associated with the multiple videos. The multiple videos may be a subset of videos, of the first plurality of videos, comprising the second video. The first client device may use the first manifest for downloading and/or retrieving the multiple videos from the one or more first servers and/or for transmitting milestone indications associated with the multiple videos. The first manifest may not comprise access web addresses, beacon web addresses and/or milestone markers associated with videos of the first plurality of videos other than the multiple videos. Thus, in order to present videos of the first plurality of videos other than the multiple videos, the first client device and/or the video player may require other manifests associated with the videos. Accordingly, the second manifest may be transmitted to the first client device. The second manifest may be associated with one or more videos, of the first plurality of videos, other than the multiple videos associated with the first manifest. For example, the one or more videos may follow (e.g., directly follow) the multiple videos. The second manifest may be transmitted to and/or received by the first client device prior to and/or upon completion of presentation of the multiple videos via the first client device to enable the first client device to begin presenting the one or more videos following (and/or directly following) completion of the multiple videos (such that there is no delay between presentation of the multiple videos and presentation of the one or more videos and/or such that a delay between presentation of the multiple videos and presentation of the one or more videos is less than the threshold delay).

Alternatively and/or additionally, rather than transmitting the plurality of manifests to the first client device, a single manifest, such as the first manifest, may be transmitted to the first client device. For example, the first manifest may comprise access web addresses, beacon web addresses and/or milestone markers associated with the first plurality of videos. For example, the first client device may use the first manifest to access the first plurality of videos and/or to transmit milestone indications associated with the first plurality of videos.

Figure 5B:
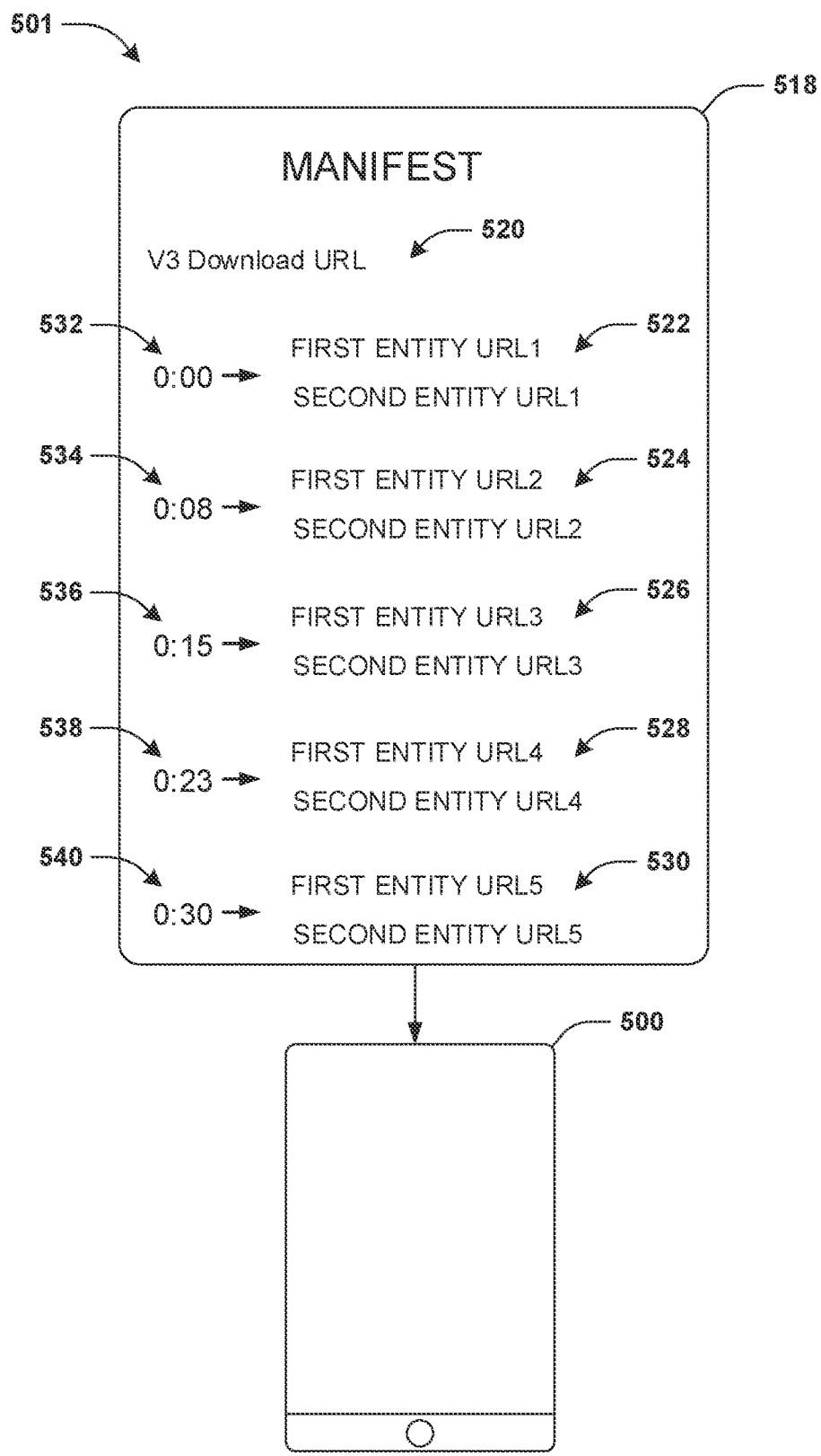
FIG. 5B is a diagram illustrating an exemplary system for determining milestone information associated with video presentation, where a first manifest is generated.

FIG. 5B illustrates generation of the first manifest (shown with reference number 518). The first manifest 518 is used for presentation of the first plurality of videos via the first client device (shown with reference number 500). In an exemplary embodiment of the system 501 illustrated in FIGS. 5B-5G, the first plurality of videos corresponds to the first example 510 of the first plurality of videos. In the exemplary embodiment of the system 501 illustrated in FIGS. 5B-5G, the second video for which information is provided in the first manifest 518 corresponds to the video V3 (comprising the first content item 504) of the first example 510 of the first plurality of videos.

In some examples, the first manifest 518 comprises the first access web address (shown as "V3 download URL" with reference number 520) associated with accessing the video V3. The first manifest 518 may comprise a first milestone marker 532 and/or a first set of beacon web addresses 522 associated with the first milestone marker 532. The first milestone marker 532 may correspond to a time 0:00 of the video V3 and/or the first content item 504 (e.g., the first milestone marker 532 may correspond to presentation of the video V3 and/or the first content item 504 starting). The first set of beacon web addresses 522 may comprise the first beacon web address (shown as "FIRST ENTITY URL1") associated with the first entity (e.g., the content system) and/or the second beacon web address (shown as "SECOND ENTITY URL1") associated with the second entity (e.g., an entity different than the first entity).

The first manifest 518 may comprise a second milestone marker 534 and/or a second set of beacon web addresses 524 associated with the second milestone marker 534. The second milestone marker 534 may correspond to a time 0:08 of the video V3 and/or the first content item 504 (e.g., the second milestone marker 534 may correspond to presentation of the video V3 and/or the first content item 504 reaching the time 0:08 of the video V3 and/or the first content item 504). The second set of beacon web addresses 524 may comprise the third beacon web address (shown as "FIRST ENTITY URL2") associated with the first entity and/or the fourth beacon web address (shown as "SECOND ENTITY URL2") associated with the second entity.

The first manifest 518 may comprise a third milestone marker 536 and/or a third set of beacon web addresses 526 associated with the third milestone marker 536. The third milestone marker 536 may correspond to a time 0:15 of the video V3 and/or the first content item 504 (e.g., the third milestone marker 536 may correspond to presentation of the video V3 and/or the first content item 504 reaching the time 0:15 of the video V3 and/or the first content item 504). The third set of beacon web addresses 526 may comprise a fifth beacon web address (shown as "FIRST ENTITY URL3") associated with the first entity and/or a sixth beacon web address (shown as "SECOND ENTITY URL3") associated with the second entity.

The first manifest 518 may comprise a fourth milestone marker 538 and/or a fourth set of beacon web addresses 528 associated with the fourth milestone marker 538. The fourth milestone marker 538 may correspond to a time 0:23 of the video V3 and/or the first content item 504 (e.g., the fourth milestone marker 538 may correspond to presentation of the video V3 and/or the first content item 504 reaching the time 0:23 of the video V3 and/or the first content item 504). The fourth set of beacon web addresses 528 may comprise a seventh beacon web address (shown as "FIRST ENTITY URL4") associated with the first entity and/or an eighth beacon web address (shown as "SECOND ENTITY URL4") associated with the second entity.

The first manifest 518 may comprise a fifth milestone marker 540 and/or a fifth set of beacon web addresses 530 associated with the fifth milestone marker 540. The fifth milestone marker 540 may correspond to a time 0:30 of the video V3 and/or the first content item 504 (e.g., the fifth milestone marker 540 may correspond to completion of presentation of the video V3 and/or the first content item 504). The fifth set of beacon web addresses 530 may comprise a ninth beacon web address (shown as "FIRST ENTITY URL5") associated with the first entity and/or a tenth beacon web address (shown as "SECOND ENTITY URL5") associated with the second entity.

The first manifest 518 may be transmitted to the first client device 500. For example, the first manifest 518 (and/or other manifests associated with presentation of the first plurality of videos) may be transmitted to the first client device 500 based upon (and/or responsive to) reception of the first request for presentation of the first video via the first client device 500.

Figure 5C:
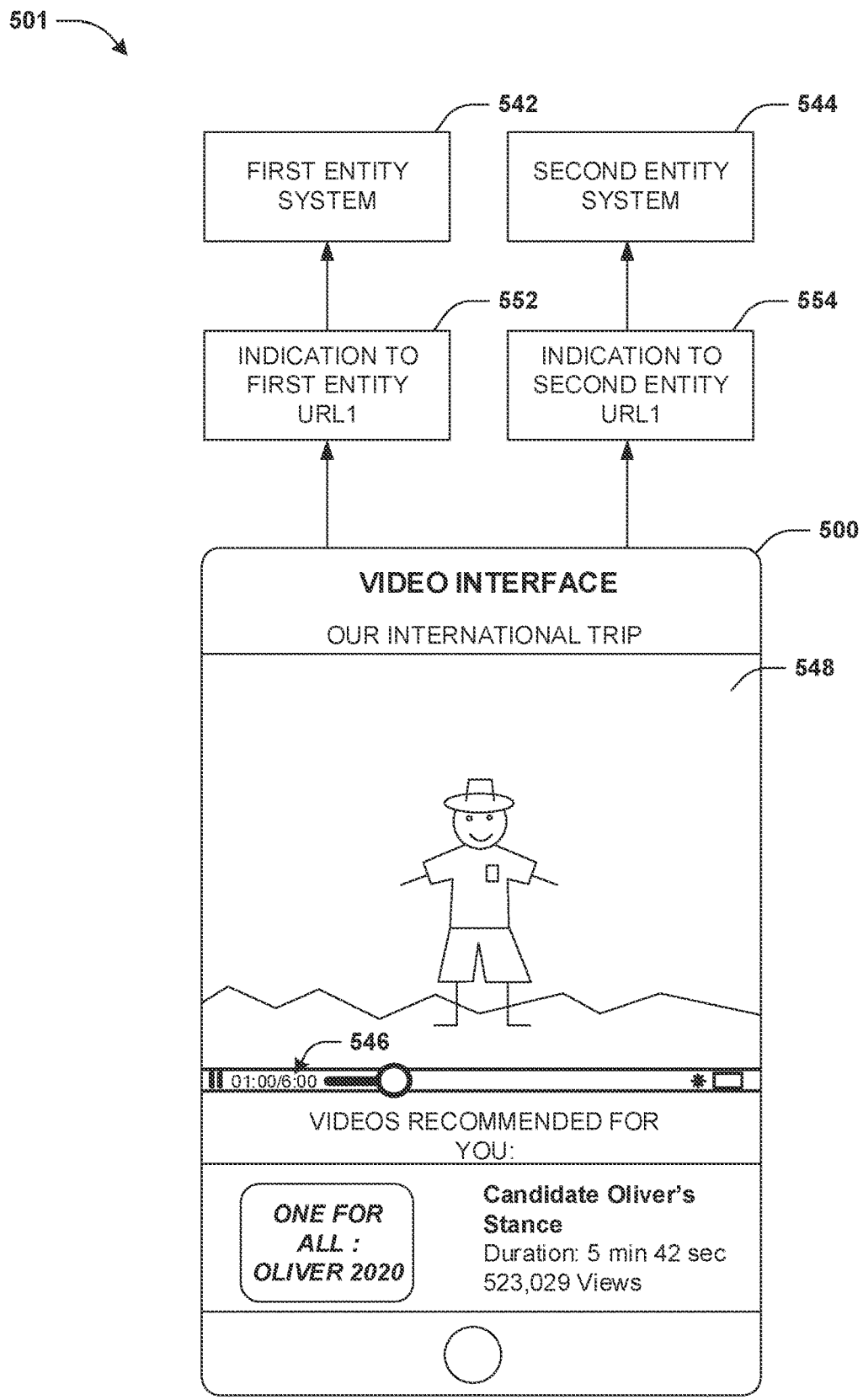
FIG. 5C is a diagram illustrating an exemplary system for determining milestone information associated with video presentation, where a first content item is presented and/or one or more milestone indications are transmitted by a first client device.

FIG. 5C illustrates presentation of the first content item 504 and/or transmission of one or more milestone indications by the first client device 500. For example, the video player of the video interface may download and/or stream one or more videos of the first plurality of videos using the first manifest 518 and/or one or more other manifests transmitted to the first client device 500. The video interface may comprise a display area 548 in which the one or more videos are displayed. In some examples, the display area 548 (and/or a display size with which the one or more videos are displayed) may be sized depending on at least one of a size of a display of the first client device 500, a display mode of the video interface (e.g., at least one of full-screen mode, half-window mode, etc.), an aspect ratio of the one or more videos, etc.

In some examples, the video interface may display a time indication 546 at least one of adjacent to, overlaying, below, etc. the display area 548 of the video interface. The time indication 546 may indicate a time of a video that is being presented with respect to a total duration of time. For example, the time indication 546 may indicate the total duration of time and/or a playback position (e.g., a current time) with respect to the total duration of time. In some examples, such as in an exemplary embodiment of the system 501 illustrated in FIGS. 5C-5G, the total duration of time may correspond to a duration of time of the first plurality of videos (e.g., a sum of a duration of the first video 502, a duration of the first content item 504, and a duration of the second content item 506, such as 6 minutes). For example, the one or more first content items and the first video 502 may be counted in the total duration of time and/or the playback position indicated by the time indication 546 (e.g., the playback position may change and/or be displayed during presentation of a content item of the one or more first content items).

Alternatively and/or additionally, the total duration of time may correspond to merely a duration of time of the first video 502 (e.g., 5 minutes). For example, the one or more first content items may not be counted in the total duration of time and/or the playback position indicated by the time indication 546 (e.g., the playback position may not change and/or may not be displayed during presentation of a content item of the one or more first content items).

FIG. 5C illustrates a milestone associated with the first milestone marker 532 being reached (e.g., presentation of the video V3 and/or the first content item 504 starting). In some examples, the first client device 500 may transmit a first set of milestone indications addressed to the first set of beacon web addresses 522 responsive to reaching the milestone associated with the first milestone marker 532. For example, the first set of milestone indications may comprise the first milestone indication (shown with reference number 552) addressed to the first beacon web address associated with the first entity and/or the second milestone indication (shown with reference number 554) addressed to the second beacon web address associated with the second entity. For example, the first milestone indication 552 addressed to the first beacon web address may be received by a first entity system 542 (e.g., one or more servers associated with the first entity, such as the content system). Alternatively and/or additionally, the second milestone indication 554 addressed to the second beacon web address may be received by a second entity system 544 (e.g., one or more servers associated with the second entity).

Figure 5D:
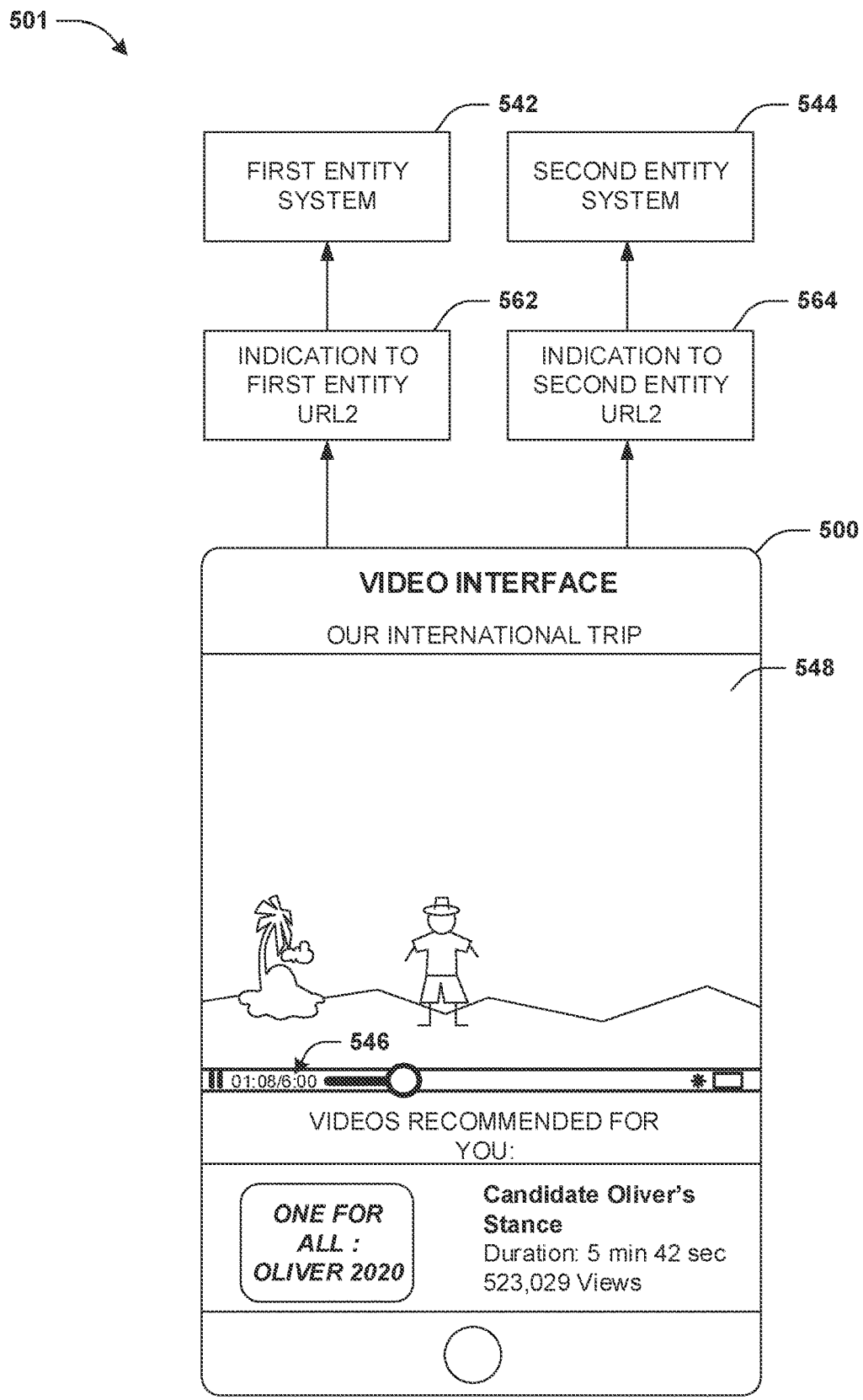
FIG. 5D is a diagram illustrating an exemplary system for determining milestone information associated with video presentation, where a milestone associated with a second milestone marker is reached.

FIG. 5D illustrates a milestone associated with the second milestone marker 534 being reached (e.g., presentation of the video V3 and/or the first content item 504 reaching the time 0:08 of the video V3 and/or the first content item 504). In some examples, the first client device 500 may transmit a second set of milestone indications addressed to the second set of beacon web addresses 524 responsive to reaching the milestone associated with the second milestone marker 534. For example, the second set of milestone indications may comprise the third milestone indication (shown with reference number 562) addressed to the third beacon web address associated with the first entity and/or the fourth milestone indication (shown with reference number 564) addressed to the fourth beacon web address associated with the second entity. For example, the third milestone indication 562 addressed to the third beacon web address may be received by the first entity system 542. Alternatively and/or additionally, the fourth milestone indication 564 addressed to the fourth beacon web address may be received by the second entity system 544.

Figure 5E:
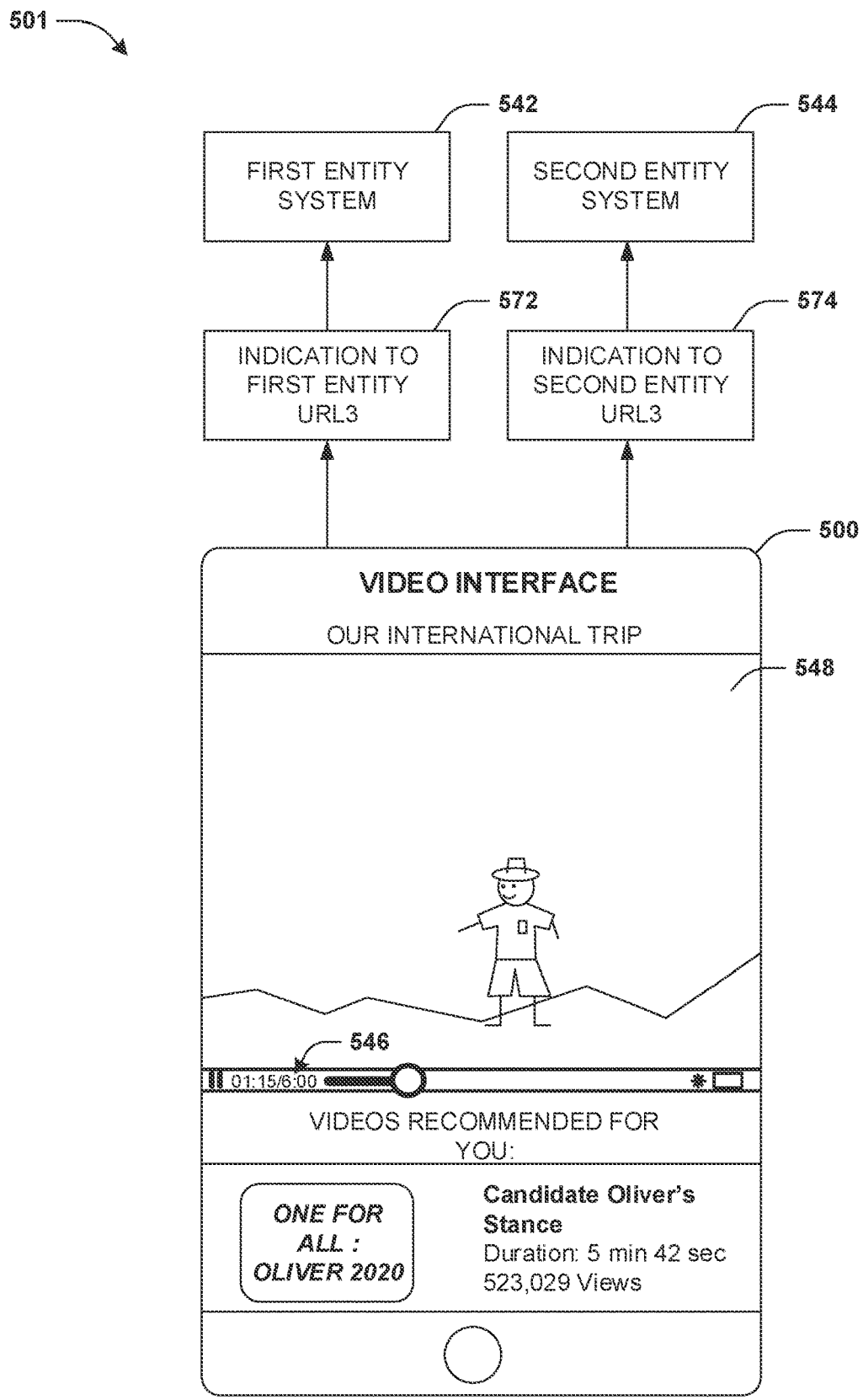
FIG. 5E is a diagram illustrating an exemplary system for determining milestone information associated with video presentation, where a milestone associated with a third milestone marker is reached.

FIG. 5E illustrates a milestone associated with the third milestone marker 536 being reached (e.g., presentation of the video V3 and/or the first content item 504 reaching the time 0:15 of the video V3 and/or the first content item 504). In some examples, the first client device 500 may transmit a third set of milestone indications addressed to the third set of beacon web addresses 526 responsive to reaching the milestone associated with the third milestone marker 536. For example, the third set of milestone indications may comprise a fifth milestone indication 572 addressed to the fifth beacon web address associated with the first entity and/or a sixth milestone indication 574 addressed to the sixth beacon web address associated with the second entity. For example, the fifth milestone indication 572 addressed to the fifth beacon web address may be received by the first entity system 542. Alternatively and/or additionally, the sixth milestone indication 574 addressed to the sixth beacon web address may be received by the second entity system 544.

Figure 5F:
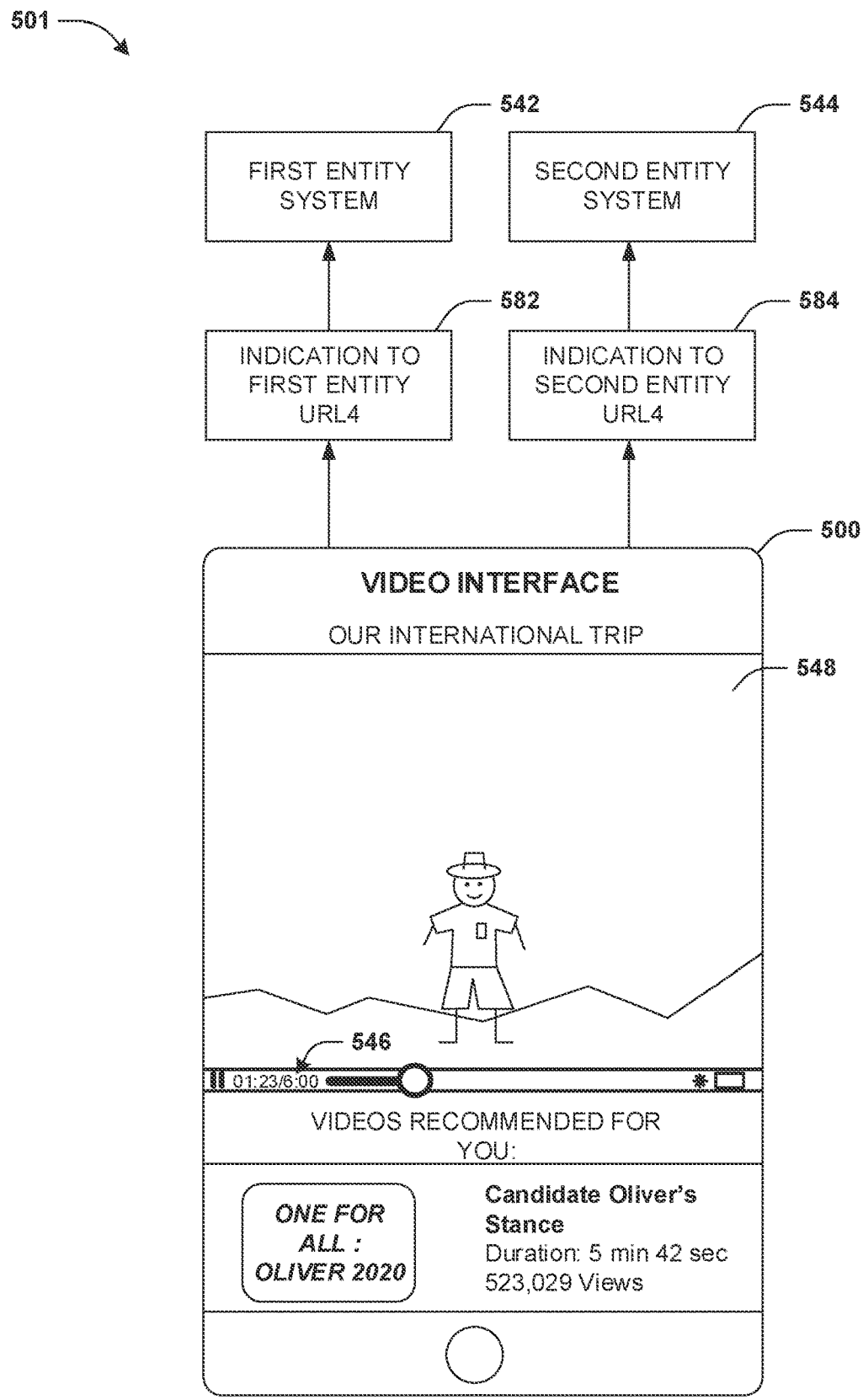
FIG. 5F is a diagram illustrating an exemplary system for determining milestone information associated with video presentation, where a milestone associated with a fourth milestone marker is reached.

FIG. 5F illustrates a milestone associated with the fourth milestone marker 538 being reached (e.g., presentation of the video V3 and/or the first content item 504 reaching the time 0:23 of the video V3 and/or the first content item 504). In some examples, the first client device 500 may transmit a fourth set of milestone indications addressed to the fourth set of beacon web addresses 528 responsive to reaching the milestone associated with the fourth milestone marker 538. For example, the fourth set of milestone indications may comprise a seventh milestone indication 582 addressed to the seventh beacon web address associated with the first entity and/or an eighth milestone indication 584 addressed to the eighth beacon web address associated with the second entity. For example, the seventh milestone indication 582 addressed to the seventh beacon web address may be received by the first entity system 542. Alternatively and/or additionally, the eighth milestone indication 584 addressed to the eighth beacon web address may be received by the second entity system 544.

Figure 5G:
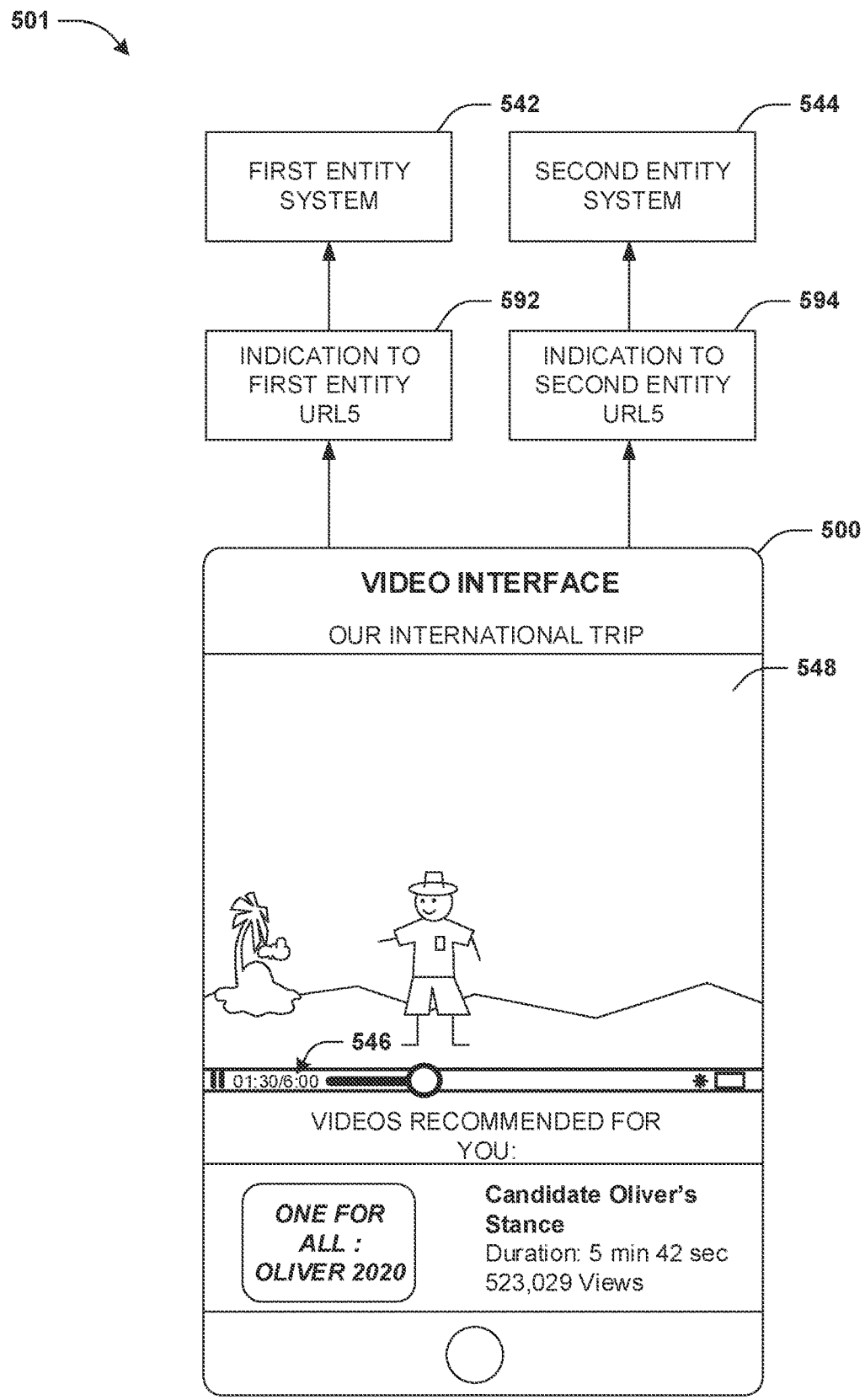
FIG. 5G is a diagram illustrating an exemplary system for determining milestone information associated with video presentation, where a milestone associated with a fifth milestone marker is reached.

FIG. 5G illustrates a milestone associated with the fifth milestone marker 540 being reached (e.g., presentation of the video V3 and/or the first content item 504 reaching the time 0:30 of the video V3 and/or the first content item 504 and/or completion of presentation of the video V3 and/or the first content item 504). In some examples, the first client device 500 may transmit a fifth set of milestone indications addressed to the fifth set of beacon web addresses 530 responsive to reaching the milestone associated with the fifth milestone marker 540. For example, the fifth set of milestone indications may comprise a ninth milestone indication 592 addressed to the ninth beacon web address associated with the first entity and/or a tenth milestone indication 594 addressed to the tenth beacon web address associated with the second entity. For example, the ninth milestone indication 592 addressed to the ninth beacon web address may be received by the first entity system 542. Alternatively and/or additionally, the tenth milestone indication 594 addressed to the tenth beacon web address may be received by the second entity system 544.

In some examples, the first entity system 542 (e.g., the content system) may determine, based upon reception of one or more milestone indications from the first client device 500, milestone information associated with presentation of the first content item 504 via the first client device 500. In some examples, the milestone information may be indicative of at least one of one or more portions of the first content item 504 presented via the first client device 500, an amount of the first content item 504 presented via the first client device 500, etc. The amount of the first content item 504 may comprise a duration of time of the first content item 504 presented via the first client device 500. Alternatively and/or additionally, the amount of the first content item 504 may comprise a proportion and/or a percentage of the first content item 504 presented via the first client device 500.

In an example where the first entity system 542 receives the first milestone indication 552 addressed to the first beacon web address but does not receive the third milestone indication 562, the fifth milestone indication 572, the seventh milestone indication 582, and/or the ninth milestone indication 592, the first entity system 542 may determine that the first client device 500 started presenting the first content item 504 but presentation of the first content item 504 did not reach the time 0:08 of the first content item 504 (e.g., presentation of the first content item 504 may have been skipped and/or the video interface may have been closed via the first client device 500 after the first client device 500 started presenting the first content item 504).

In an example where the first entity system 542 receives the first milestone indication 552 addressed to the first beacon web address and/or the third milestone indication 562 addressed to the third beacon web address but does not receive the fifth milestone indication 572, the seventh milestone indication 582, and/or the ninth milestone indication 592, the first entity system 542 may determine that the first client device 500 presented the portion 0:00-0:08 of the first content item 504 but presentation of the first content item 504 did not reach the time 0:15 of the first content item 504. Alternatively and/or additionally, the first entity system 542 may determine that the amount of the first content item 504 presented via the first client device 500 is at least 8 seconds and/or at least 27% of the first content item 504.

In an example where the first entity system 542 receives the first milestone indication 552 addressed to the first beacon web address, the third milestone indication 562 addressed to the third beacon web address, and/or the fifth milestone indication 572 addressed to the fifth beacon web address, but does not receive the seventh milestone indication 582, and/or the ninth milestone indication 592, the first entity system 542 may determine that the first client device 500 presented the portion 0:00-0:15 of the first content item 504 but presentation of the first content item 504 did not reach the time 0:23 of the first content item 504. Alternatively and/or additionally, the first entity system 542 may determine that the amount of the first content item 504 presented via the first client device 500 is at least 15 seconds and/or at least 50% of the first content item 504.

In an example where the first entity system 542 receives the first milestone indication 552 addressed to the first beacon web address, the third milestone indication 562 addressed to the third beacon web address, the fifth milestone indication 572 addressed to the fifth beacon web address, and/or the seventh milestone indication 582 addressed to the seventh beacon web address but does not receive the ninth milestone indication 592, the first entity system 542 may determine that the first client device 500 presented the portion 0:00-0:23 of the first content item 504 but presentation of the first content item 504 did not reach the time 0:30 of the first content item 504 (e.g., the first content item 504 was not completely presented via the first client device 500). Alternatively and/or additionally, the first entity system 542 may determine that the amount of the first content item 504 presented via the first client device 500 is at least 23 seconds and/or at least 77% of the first content item 504.

In an example where the first entity system 542 receives the first milestone indication 552 addressed to the first beacon web address, the third milestone indication 562 addressed to the third beacon web address, the fifth milestone indication 572 addressed to the fifth beacon web address, the seventh milestone indication 582 addressed to the seventh beacon web address, and/or the ninth milestone indication 592 addressed to the ninth beacon web address, the first entity system 542 may determine that the first client device 500 completely presented the first content item 504. Alternatively and/or additionally, the first entity system 542 may determine that the amount of the first content item 504 presented via the first client device 500 is 100% of the first content item 504.

In some examples, the milestone information may comprise display information associated with the display area 548 of the video interface. For example, the display information may be indicative of a display size of the display area 548 when one or more portions of the first content item 504 are presented. Alternatively and/or additionally, the display information may be indicative of whether or not the display area 548 is visible (e.g., opened and/or displayed by the first client device 500) when one or more portions of the first content item 504 are presented. Alternatively and/or additionally, the display information may be indicative of a display mode of the video interface (e.g., at least one of full-screen mode, half-window mode, etc.) when one or more portions of the first content item 504 are presented. In some examples, the display information may be determined based upon one or more milestone indications received from the first client device 500. For example, a milestone indication transmitted by the first client device 500 addressed to a beacon web address may be indicative of at least one of a milestone being reached, whether the display area 548 is visible before and/or when the milestone is reached, the display size of the display area 548 before and/or when the milestone is reached, the display mode of the video interface before and/or when the milestone is reached, etc.

In some examples, the first entity system 542 may use the milestone information to determine an amount of compensation to be received for presentation of the first content item 504 via the first client device 500. For example, the amount of compensation may correspond to a fee to be collected by the first entity (e.g., a company, an organization, etc.) from the second entity (e.g., an advertiser, a company, a brand, an organization, etc. using presentation of the first content item to promote one or more aspects of the second entity). For example, the amount of compensation for presentation of the first content item 504 may be less in a scenario where less of the first content item 504 is presented via the first client device 500 as compared to a scenario where more of the first content item 504 is presented via the first client device 500. Alternatively and/or additionally, the amount of compensation for presentation of the first content item 504 may be less in a scenario where the display size of the display area 548 is smaller than a threshold display size during presentation of the first content item 504 as compared to a scenario where the display size of the display area 548 is larger than the threshold display size during presentation of the first content item 504. Alternatively and/or additionally, the amount of compensation for presentation of the first content item 504 may be less in a scenario where the display area 548 is not visible and/or open during presentation of the first content item 504 as compared to a scenario where the display area 548 is visible and/or open during presentation of the first content item 504. Alternatively and/or additionally, the amount of compensation for presentation of the first content item 504 may be less in a scenario where the display mode of the video interface is half-window mode during presentation of the first content item 504 as compared to a scenario where the display mode of the video interface is full-screen mode during presentation of the first content item 504. Alternatively and/or additionally, the amount of compensation may be determined based upon a plurality of sets of milestone information associated with a plurality of instances that the first content item 504 is presented via a client device of a plurality of client devices. For example, a quantity of client devices for which the content system provided the first content item 504 to be presented may be determined based upon the plurality of sets of milestone information. The amount of compensation for presentation of the first content item 504 may be less in a scenario where the quantity of client devices is less as compared to a scenario where the quantity of client devices is more. Alternatively and/or additionally, a quantity of content events (e.g., a content event may correspond to an instance where the first content item 504 is presented via a client device) may be determined based upon the plurality of sets of milestone information. The amount of compensation for presentation of the first content item 504 may be less in a scenario where the quantity of content events is less as compared to a scenario where the quantity of content events is more.

In some examples, the second entity may require confirmation that the amount of compensation to be collected by the first entity is correct, i.e. that actual milestone information associated with the first client device 500 and/or other client devices is correctly determined and that the amount of compensation reflects the actual milestone information. Providing client devices, such as the first client device 500, with one or more beacon web addresses associated with the second entity enables the client devices to transmit indications to the second entity system 544 in association with presentation of the first content item 504, and thus enables the second entity system 544 to determine milestone information associated with presentation of the first content item 504 and to determine the amount of compensation. Accordingly, the milestone information and/or the amount of compensation may be confirmed and/or validated by the first entity and/or the second entity.

It may be appreciated that the present disclosure provides for techniques that, when implemented, enable the content system to accurately determine the milestone information associated with presentation of the first content item 504. Further, implementation of one or more of the techniques provided herein enables determination of the milestone information in scenarios in which the content system employs at least one of server-side ad insertion (SSAI), server-side ad stitching, etc. to present content, whereby the first content item 504 is delivered in association with content of the first video 502 to enable a seamless user experience. In some SSAI systems, the milestone information associated with presentation of the first content item 504 may not automatically be available to the SSAI system, and thus the milestone information may not be reliably determined and/or sent to the second entity. Providing the first manifest comprising at least one of milestone markers, beacon web addresses associated with the first entity, beacon web addresses associated with the second entity, etc. to the first client device 500 enables the first client device 500 (and/or the video player of the first client device 500) to transmit milestone indications to one or more desired entities (e.g., the first entity and/or the second entity and/or one or more other entities associated with the beacon web addresses in the first manifest) responsive to reaching milestones. Thus, the milestone indications are accurate and reliable indicators of a status of the presentation of the first content item 504 and can be used by the one or more desired entities to accurately determine the milestone information.

In some examples, the first user profile associated with the first client device 500 may be modified based upon milestone information associated with presentation of one or more videos (e.g., the first content item 504, the second content item 506, the first video 502, and/or one or more other videos) via the first client device 500. The milestone information associated with the presentation of the one or more videos may be determined using one or more of the techniques provided herein. For example, one or more topics of the one or more videos may be determined. An amount of interest of the first user in the one or more topics may be determined based upon the milestone information. For example, the determined amount of interest of the user in the one or more topics may be less in a scenario where less of the one or more videos is presented via the first client device 500 as compared to a scenario where more of the one or more videos is presented via the first client device 500. The first user profile may be modified based upon the amount of interest, and/or the amount of interest may be used for selecting content items for presentation via the first client device 500. In an example, responsive to receiving a request for content (e.g., a request to be presented with a content item, such as an advertisement) bid values and/or click probabilities associated with content items may be determined based upon the amount of interest. A content item may be selected for presentation via the first client device 500 based upon the bid values and/or the click probabilities, such as using one or more of the techniques provided herein.

In some examples, the milestone information may comprise information associated with the first video 502 rather than (and/or in addition to) information associated with the one or more first content items (such as the first content item 504 and/or the second content item 506). For example, the milestone information may be indicative of at least one of one or more portions of the first video 502 presented via the first client device 500, an amount of the first video 502 presented via the first client device 500, etc. For example, the one or more portions and/or the amount of the first video 502 presented via the first client device 500 may be determined using one or more of the techniques provided herein.

In some examples, the first video is a live-stream video. The live-stream video may be presented to broadcast a live event (e.g., performances, video-games, games, sports, concerts, meetings, speeches, etc.) in real time and/or in near-real time. In some examples, an arrangement and/or an order in which one or more content items of the one or more first content items are displayed with respect to portions of the live-stream video may be determined and/or updated over time while the live-stream video is being presented via the first client device. For example, video may be generated based upon portions of the live-stream video (as the portions become available) and/or the one or more content items such that the video comprises portions of the live-stream video and/or the one or more content items. The first manifest may be updated periodically as portions of the live-stream video become available. For example, the first manifest may be updated by transmitting updated manifest information associated with newly generated video generated based upon newly available portions of the live-stream video and/or one or more content items. The updated manifest information may comprise one or more access web addresses used for streaming the video comprising the newly available portions of the live-stream video and/or the one or more content items. Alternatively and/or additionally, the updated manifest information may comprise one or more beacon web addresses and/or one or more manifest markers used for transmitting milestone indications associated with presentation of the newly available portions of the live-stream video and/or milestone indications associated with presentation of one or more content items. Responsive to receiving the updated manifest information, the first client device (and/or the video player of the first client device) may clear at least some of the first manifest and/or add the updated manifest information to the first manifest to update the first manifest. Responsive to updating the first manifest, the first client device (and/or the video player of the first client device) may use the first manifest to stream the newly available portions of the live-stream video and/or the one or more content items. Alternatively and/or additionally, the first client device (and/or the video player of the first client device) may use the one or more beacon web addresses and/or the one or more manifest markers of the updated manifest information to transmit milestone indications associated with the newly available portions of the live-stream video and/or the one or more content items. Alternatively and/or additionally, rather than updating the first manifest with the updated manifest information, a second manifest may be generated for streaming the video comprising the newly available portions of the live-stream video and/or the one or more content items. The second manifest may comprise the one or more beacon web addresses and/or the one or more manifest markers for the first client device to use for transmitting milestone indications associated with the newly available portions of the live-stream video and/or the one or more content items. The second manifest may be transmitted to the first client device.

In some examples, a video is presented via a plurality of client devices using one or more of the techniques provided herein. For example, the video may comprise at least one of a livestream video, a movie, a TV show, a sports video, a news-related video, a news channel video clip, an internet news video clip, an educational video, a how-to video, an educational video clip, a documentary, an entertainment video, a sports-related video clip, an informational video, an interview-related video, a video clip of a meeting, an advertisement, etc. In some examples, the video is presented along with one or more other content items, such as one or more advertisements, such as using one or more of the techniques provided herein. Alternatively and/or additionally, the video is not presented along with the one or more other content items (e.g., advertisements may not be presented in association with presentation of the video via the plurality of client devices). In some examples, one or more manifests, comprising one or more milestone markers and/or one or more beacon web addresses, are transmitted to the plurality of client devices for use in presenting the video. In some examples, a plurality of videos may be generated based upon the video (e.g., the plurality of videos may comprise video segments of the video) and/or the plurality of videos may be stored on one or more servers. One or more videos of the plurality of videos may be accessed, downloaded and/or streamed by a client device of the plurality of client devices using a manifest of the one or more manifests. Alternatively and/or additionally, the plurality of videos may not be generated. For example, the video as a whole (and/or an encoded version of the video) may be stored on one or more servers and/or may be accessed, downloaded and/or streamed by a client device of the plurality of client devices using a manifest of the one or more manifests. In some examples, milestone indications associated with milestone markers may be received from client devices of the plurality of client devices using one or more of the techniques provided herein.

In some examples, a plurality of sets of milestone information associated with presentation of the video via the plurality of client devices may be determined. The plurality of sets of milestone information may be determined based upon milestone indications received from client devices of the plurality of client devices. For example, a set of milestone information of the plurality of sets of milestone information may be indicative of at least one of one or more portions of the video presented via a client device of the plurality of client devices, an amount of the video presented via the client device of the plurality of client devices, etc. For example, metrics associated with presentation of the video may be determined based upon the plurality of sets of milestone information. The metrics may comprise a measure of client devices that start the video (e.g., a quantity of client devices on which presentation of the video starts). Alternatively and/or additionally, the metrics may comprise a measure of client devices that present a certain portion of the video (e.g., a quantity of client devices on which the certain portion of the video is presented and/or a rate at which client devices that start the video also present the certain portion of the video). Alternatively and/or additionally, the metrics may comprise a measure of client devices that stop presenting the video during a certain portion of the video (e.g., a quantity of client devices that stop presenting the video during the certain portion of the video and/or a rate at which client devices that start the video stop presenting the video during the certain portion of the video). Alternatively and/or additionally, the metrics may comprise a measure of client devices that present the video completely (e.g., a quantity of client devices that completely present the video and/or a rate at which client devices that start the video completely present the video).

Alternatively and/or additionally, the metrics may comprise metrics determined with respect to client devices having various characteristics. For example, the metrics may comprise a plurality of sets of metrics associated with a plurality of characteristics, where each set of metrics of the plurality of sets of metrics is associated with one or more characteristics of the plurality of characteristics. For example, a first set of metrics of the plurality of sets of metrics may be associated with a first characteristic, and/or may be determined based upon the plurality of sets of milestone information and/or by identifying client devices that are associated with the first characteristic. The first set of metrics may comprise a measure of client devices associated with the first characteristic that start the video. For example, the measure of client devices that start the video may comprise a quantity of client devices, associated with the first characteristic, on which presentation of the video starts. Alternatively and/or additionally, the measure of client devices that start the video may comprise a rate at which client devices that are associated with the first characteristic start the video. The rate may correspond to a proportion of client devices associated with the first characteristic that start the video (e.g., in a scenario where 100 client devices are associated with the first characteristic and 50 client devices start the video, the rate may correspond to 50%). Alternatively and/or additionally, the first set of metrics may comprise a measure of client devices, associated with the first characteristic, that display a certain portion of the video (e.g., a quantity of client devices associated with the first characteristic on which the certain portion of the video is presented, a rate at which client devices associated with the first characteristic present the certain portion of the video, and/or a rate at which client devices, that are associated with the first characteristic and that start the video, also present the certain portion of the video). Alternatively and/or additionally, the first set of metrics may comprise a measure of client devices, associated with the first characteristic, that stop presenting the video during a certain portion of the video (e.g., a quantity of client devices associated with the first characteristic that stop presenting the video during the certain portion of the video, a rate at which client devices associated with the first characteristic stop presenting the video during the certain portion of the video, and/or a rate at which client devices, that are associated with the first characteristic and that start the video, stop presenting the video during the certain portion of the video). Alternatively and/or additionally, the metrics may comprise a measure of client devices, associated with the first characteristic, that present the video completely (e.g., a quantity of client devices associated with the first characteristic that completely present the video, a rate at which client devices associated with the first characteristic completely present the video, and/or a rate at which client devices, that are associated with the first characteristic and that start the video, completely present the video).

In an example, a characteristic of the plurality of characteristics may correspond to client devices (and/or users) that have access to the video (such as users that have a subscription, and/or that otherwise have access, for streaming videos provided by a video platform). For example, a set of metrics, of the plurality of sets of metrics, associated with the characteristic may be determined by identifying client devices that have access to the video (and/or by determining a quantity of client devices that have access to the video). The set of metrics may be determined based the quantity of client devices and/or based upon sets of milestone information, of the plurality of sets of milestone information, associated with client devices associated with the characteristic.

Alternatively and/or additionally, a characteristic of the plurality of characteristics may correspond to one or more demographics (e.g., users associated with a location, an age (and/or an age range), family size, gender, occupation, income and/or other demographics). For example, a set of metrics, of the plurality of sets of metrics, associated with the characteristics may be determined by identifying client devices associated with users that are associated with the one or more demographics (and/or by determining a quantity of client devices that are associated with users that are associated with the one or more demographics). The set of metrics may be determined based the quantity of client devices and/or based upon sets of milestone information, of the plurality of sets of milestone information, associated with client devices associated with the characteristic.

Alternatively and/or additionally, a characteristic of the plurality of characteristics may correspond to one or more content items (e.g., at least one of an article, a video, an audio file, an image, a webpage, an advertisement, an email, a message, etc.) at least one of consumed, accessed, selected, interacted with, etc. For example, a set of metrics, of the plurality of sets of metrics, associated with the characteristics may be determined by identifying client devices associated with at least one of consuming, accessing, selecting, interacting with, etc. the one or more content times (and/or by determining a quantity of client devices that are associated with at least one of consuming, accessing, selecting, interacting with, etc. the one or more content times). The set of metrics may be determined based the quantity of client devices and/or based upon sets of milestone information, of the plurality of sets of milestone information, associated with client devices associated with the characteristic.

The metrics and/or the plurality of sets of metrics may be analyzed to determine viewership information associated with the video, such as at least one of a popularity of the video, a popularity of the video among users having one or more characteristics of the plurality of characteristics, one or more portions of the video presented more than a threshold number of times, one or more portions of the video presented more than a threshold number of times by users having one or more characteristics of the plurality of characteristics, total viewership of the video, viewership of the video among users having one or more characteristics of the plurality of characteristics, etc. The metrics, the plurality of sets of metrics and/or the viewership information may be transmitted to one or more entities, such as an entity associated with the video (e.g., a website, an application, a service, a periodical publication, a company, a person and/or an organization that publishes, distributes, creates, originates, funds, distributes, manages, and/or oversees production of the video) and/or one or more other entities. The metrics, the plurality of sets of metrics and/or the viewership information may be used to evaluate the video to determine portions of the video having audience approval (e.g., portions of the video viewed higher amounts of times than other portions of the video) and/or audience disapproval (e.g., portions of the video during which higher amounts of users exited and/or stopped viewing the video), determine an audience size and/or popularity of the video among various demographic groups, etc.

It may be appreciated that the disclosed subject matter may assist an entity (e.g., the first entity, the second entity and/or a different entity) in accurately determining milestone information associated with presentation of a content item, a quantity of client devices for which the content system provided the content item to be presented, a quantity of content events associated with the content item and/or an amount of compensation for presentation of the content item. Further, the disclosed subject matter enables multiple entities to have access to milestone indications associated with presentation of content items and/or videos, and thus enables an entity to validate and/or confirm another entity's determination of the milestone information associated with presentation of the content item, the quantity of client devices for which the content system provided the content item to be presented, the quantity of content events associated with the content item and/or the amount of compensation for presentation of the content item.

Implementation of at least some of the disclosed subject matter may lead to benefits including, but not limited to, more accurate determination of milestone information associated with presentation of a content item, a quantity of client devices for which the content system provided the content item to be presented, a quantity of content events associated with the content item and/or an amount of compensation for presentation of the content item (e.g., as a result of providing the first manifest comprising at least one of milestone markers, beacon web addresses associated with the first entity, beacon web addresses associated with the second entity, etc. to the first client device, which enables the first client device (and/or the video player of the first client device) to transmit milestone indications to one or more desired entities responsive to reaching milestones, etc.).

Alternatively and/or additionally, implementation of at least some of the disclosed subject matter may lead to benefits including more accurate determination of viewership information (e.g., as a result of the more accurate determination of the milestone information associated with presentation of a content item, the quantity of client devices for which the content system provided the content item to be presented, the quantity of content events associated with the content item and/or the amount of compensation for presentation of the content item, etc.).

Alternatively and/or additionally, implementation of at least some of the disclosed subject matter may lead to benefits including enabling determination of the milestone information in scenarios in which the content system employs at least one of SSAI, server-side ad stitching, etc. to present content, such as discussed above.

In some examples, at least some of the disclosed subject matter may be implemented on a client device, and in some examples, at least some of the disclosed subject matter may be implemented on a server (e.g., hosting a service accessible via a network, such as the Internet).

Figure 6:
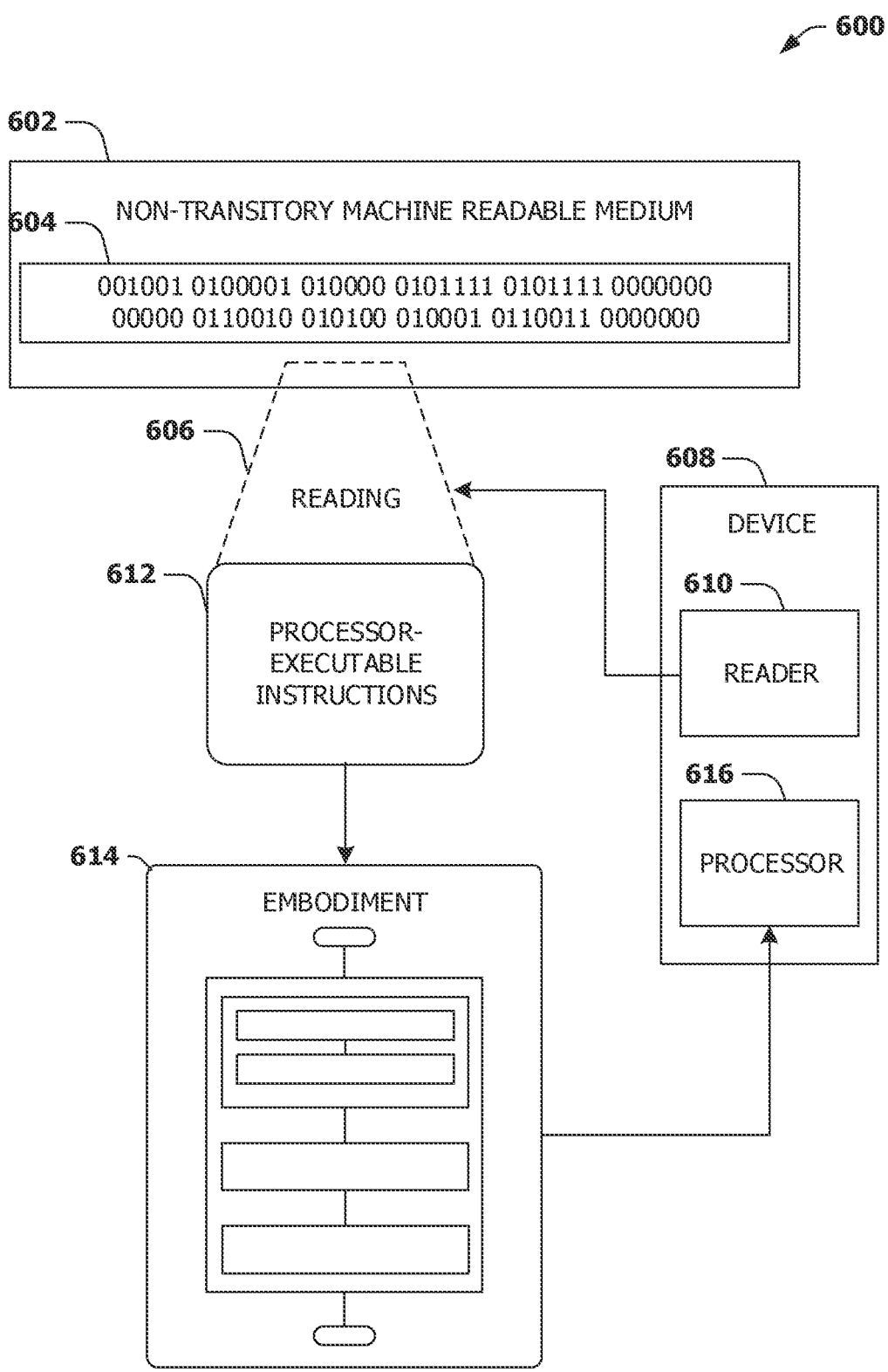
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 606 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the exemplary system 501 of FIGS. 5A-5G, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
receiving a first request for presentation of a first video via a first client device;
selecting one or more first content items for presentation via the first client device;
generating a first plurality of videos using the first video and the one or more first content items, wherein:
a second video of the first plurality of videos comprises at least a portion of a first content item of the one or more first content items; and
a third video of the first plurality of videos comprises a video segment of the first video;
storing the first plurality of videos on one or more first servers;
generating a manifest comprising:
a first web address associated with accessing the second video of the first plurality of videos;
one or more first milestone markers of the second video; and
one or more first beacon web addresses associated with the one or more first milestone markers;
transmitting, to the first client device, the manifest;
receiving, by a server and from the first client device, an indication addressed to a first beacon web address of the one or more first beacon web addresses, wherein:
the first beacon web address is associated with a first milestone marker of the one or more first milestone markers; and
the first milestone marker corresponds to a first portion of the first content item; and
determining, by the server and based upon the indication received by the server and addressed to the first beacon web address included in the manifest transmitted to the first client device, that the first client device displayed the first portion of the first content item.

2. The method of claim 1, wherein the indication received by the server is responsive to the manifest transmitted to the first client device.

3. The method of claim 1, comprising:
receiving, from the first client device, an indication addressed to a second beacon web address of the one or more first beacon web addresses, wherein:
the second beacon web address is associated with a second milestone marker of the one or more first milestone markers; and
the second milestone marker corresponds to a second portion of the first content item; and
determining, based upon the indication addressed to the second beacon web address, that the first client device displayed the second portion of the first content item.

4. The method of claim 1, wherein:
the one or more first beacon web addresses comprise a second beacon web address;
the second beacon web address is associated with the first milestone marker;
the first beacon web address is associated with a first entity;
the second beacon web address is associated with a second entity associated with the first content item;
the second entity is different than the first entity; and
the first client device is configured such that the first client device transmits, based upon the manifest, the indication addressed to the first beacon web address and a second indication addressed to the second beacon web address responsive to displaying the first portion of the first content item.

5. The method of claim 1, wherein:
the one or more first content items comprise one or more videos.

6. The method of claim 5, wherein the generating the first plurality of videos comprises:
encoding a first portion of a video of the one or more videos based upon at least one of a bit rate or a resolution to generate a video of the first plurality of videos, wherein the video of the first plurality of videos has at least one of the bit rate or the resolution.

7. The method of claim 1, wherein:
a milestone marker of the one or more first milestone markers corresponds to at least one of:
a time of the second video;
a video frame of the second video; or
a portion of the second video.

8. A computing device comprising:
a processor; and
memory comprising processor-executable instructions that when executed by the processor cause performance of operations, the operations comprising:
receiving a first request for presentation of a first video via a first client device;
generating a first plurality of videos using the first video, wherein a second video of the first plurality of videos comprises a video segment of the first video;
storing the first plurality of videos on one or more first servers;
generating a manifest comprising:
a first web address associated with accessing the second video of the first plurality of videos;
a first milestone marker of the second video;
a first beacon web address associated with the first milestone marker and a first entity; and
a second beacon web address associated with the first milestone marker and a second entity different than the first entity; and
transmitting, to the first client device, the manifest, wherein the manifest configures the first client device to transmit a first indication addressed to the first beacon web address and a second indication addressed to the second beacon web address responsive to displaying a portion of the second video corresponding to the first milestone marker.

9. The computing device of claim 8, the operations comprising:
   receiving, from the first client device, an indication addressed to the first beacon web address; and
   determining, based upon the indication addressed to the first beacon web address, that the first client device displayed a first portion of the second video corresponding to the first milestone marker.

10. The computing device of claim 9, the operations comprising:
    receiving, from the first client device, an indication addressed to a third beacon web address; and
    determining, based upon the indication addressed to the third beacon web address, that the first client device displayed a second portion of the second video corresponding to a second milestone marker.

11. The computing device of claim 8, wherein the generating the first plurality of videos comprises:
    encoding a first portion of the first video based upon a bit rate to generate a video of the first plurality of videos, wherein the video has the bit rate.

12. The computing device of claim 8, wherein the generating the first plurality of videos comprises:
    encoding a first portion of the first video based upon a resolution to generate a video of the first plurality of videos, wherein the video has the resolution.

13. The computing device of claim 8, wherein:
    the first milestone marker corresponds to at least one of:
    a time of the second video;
    a video frame of the second video; or
    a portion of the second video.

14. A non-transitory machine readable medium having stored thereon processor-executable instructions that when executed cause performance of operations, the operations comprising:
    generating a manifest associated with a first video, wherein the manifest comprises:
      a first web address associated with accessing the first video;
      one or more first milestone markers of the first video; and
      one or more first beacon web addresses associated with the one or more first milestone markers;
    transmitting, to a first client device, the manifest;
    receiving, by a server and from the first client device, an indication addressed to a first beacon web address of the one or more first beacon web addresses; and
    determining, by one or more servers and based upon the indication received by the server and addressed to the first beacon web address included in the manifest transmitted to the first client device, that the first client device displayed a first portion of the first video corresponding to a first milestone marker, of the one or more first milestone markers, associated with the first beacon web address.

15. The non-transitory machine readable medium of claim 14, the operations comprising:
    providing compensation based upon the determination that the first client device displayed the first portion of the first video corresponding to the first milestone marker.

16. The non-transitory machine readable medium of claim 14, the operations comprising:
    at least one of validating or confirming at least one of milestone information or compensation based upon the determination that the first client device displayed the first portion of the first video corresponding to the first milestone marker.

17. The non-transitory machine readable medium of claim 14, the operations comprising:
    modifying a profile based upon the determination that the first client device displayed the first portion of the first video corresponding to the first milestone marker.

18. The non-transitory machine readable medium of claim 14, the operations comprising:
    determining metrics based upon the determination that the first client device displayed the first portion of the first video corresponding to the first milestone marker; and
    transmitting the metrics to one or more entities.

19. The non-transitory machine readable medium of claim 14, wherein:
    the one or more first beacon web addresses comprise a second beacon web address associated with the first milestone marker;
    the first beacon web address is associated with a first entity;
    the second beacon web address is associated with a second entity, different than the first entity; and
    the first client device is configured such that the first client device transmits, based upon the manifest, a first indication addressed to the first beacon web address and a second indication addressed to the second beacon web address responsive to displaying a portion of the first video corresponding to the first milestone marker.

20. The non-transitory machine readable medium of claim 14, the operations comprising:
    determining metrics based upon the determination that the first client device displayed the first portion of the first video corresponding to the first milestone marker; and
    evaluating the first video based upon the metrics.

* * * * *